United States Patent [19]

Hsieh et al.

[11] Patent Number: 5,968,674
[45] Date of Patent: Oct. 19, 1999

[54] CONDUCTIVE POLYMER COATINGS AND PROCESSES THEREOF

[75] Inventors: Bing R. Hsieh, Webster; Joan R. Ewing, Fairport; Anita C. VanLaeken, Macedon, all of N.Y.

[73] Assignee: Xerox Corporation, Stamford, Conn.

[21] Appl. No.: 08/950,300

[22] Filed: Oct. 14, 1997

[51] Int. Cl.$^6$ ....................................................... B32B 9/00
[52] U.S. Cl. ............... 428/690; 252/519.33; 252/519.34; 427/66; 428/917; 430/59
[58] Field of Search ..................................... 313/503–509; 427/66, 384, 385.5; 428/690, 691, 917, 36.91, 409, 906; 252/500, 518.1, 519.4, 519.33, 519.34; 430/58, 59, 62, 75

[56] References Cited

U.S. PATENT DOCUMENTS

| | | | |
|---|---|---|---|
| 4,338,222 | 7/1982 | Limburg et al. ........................ | 252/500 |
| 5,300,339 | 4/1994 | Hays et al. .............................. | 428/36.9 |
| 5,334,699 | 8/1994 | Hsieh ................................. | 430/114 X |
| 5,362,421 | 11/1994 | Kropp et al. ........................ | 252/514 X |
| 5,386,277 | 1/1995 | Hays et al. .............................. | 355/259 |
| 5,448,342 | 9/1995 | Hays et al. .............................. | 355/259 |
| 5,549,851 | 8/1996 | Fukushima et al. ..................... | 252/519 |
| 5,587,224 | 12/1996 | Hsieh et al. ............................ | 428/195 |
| 5,728,801 | 3/1998 | Wu et al. ............................ | 427/384 X |
| 5,853,906 | 12/1998 | Hsieh ..................................... | 428/690 |

*Primary Examiner*—Michael Lusignan
*Attorney, Agent, or Firm*—John L. Haack

[57] ABSTRACT

A conductive polymer coating comprising an arylamine charge transport compound, an oxidized arylamine charge transport compound salt, and a polymer binder, wherein the oxidized arylamine charge transport compound salt has a counter anion selected from the group consisting of hexafluoroantimonate and hexafluoroarsenate.

20 Claims, No Drawings

CONDUCTIVE POLYMER COATINGS AND PROCESSES THEREOF

CROSS REFERENCE TO COPENDING APPLICATIONS AND PATENTS

Reference is made to commonly assigned applicatons: U.S. Ser. No. 08/323,695 (D/93632), filed Oct. 18, 1994, now U.S. Pat. No. 5,834,080, entitled "CONTROLLABLY CONDUCTIVE POLYMER COMPOSITIONS FOR DEVELOPMENT SYSTEMS", which discloses thiophene containing conductive coatings for development apparatus resulting from doping with a triarylamine cation radical salts; U.S. Ser. No. 08/453,108 (D/95058), filed May 30, 1995, now U.S. Pat. No. 5,731,078, entitled "DEVELOPING APPARATUS AND COATED ROLLER", which discloses conductive coatings resulting from doping with perfluoroacids; and U.S. Ser. No. 08/950,303 filed Oct. 14, 1997, now U.S. Pat. No. 5,853,906 (D/97457), entitled "PROCESSES OF CONDUCTIVE POLYMER COATINGS AND COMPOSITIONS THEREOF".

Attention is directed to commonly owned and assigned U.S. Pat. No. 5,587,224, issued Dec. 24, 1996, entitled "DEVELOPING APPARATUS INCLUDING A COATED DEVELOPER ROLLER".

The disclosures of each of the aforementioned copending applications and patents are totally incorporated herein by reference.

BACKGROUND OF THE INVENTION

The present invention relates to polymeric coating compositions having controllable, reproducible and stable electrical conductivity of, for example, about 1.0 to about $10^{-12}$ S/cm or (ohm-cm)$^{-1}$. Certain coating compositions with electrical conductivity in the range of about $10^{-8}$ to about $10^{-10}$ S/cm are useful antistatic materials or charge relaxation materials that may be used in electrophotographic image development systems such as liquid image development systems or scavengeless and hybrid scavengeless development systems. The scavengeless development systems do not scavenge or interact with a previously toned image, so as to adversely affect image quality, and are important, for example, in trilevel and highlight color xerography as disclosed, for example, in U.S. Pat. No. 4,078,929. Two-phase conductive compositions contain dispersions of conductive particles, for example, carbon black or graphite, within insulating polymer matrices, for example, dielectric binders such as a phenolic resin or fluoropolyrner, which are close to the percolation threshold concentration. Such concentration levels allow conductive particle contact, resulting in a burst of conductivity, see for example, Brewington et al., U.S. Pat. No. 4,505,573. The dielectric constant of these overcoatings can range from about 3 to about 5, and preferably is about 3. The desired conductivity is achieved by controlling the loading of the conductive particles. However, the low conductivity values required for electrophotographic image development systems and the large, intrinsic electrical conductivity of carbon black make it extremely difficult to achieve predictable and reproducible conductivity values. Very small changes in the loading of conductive particles near the percolation threshold can cause dramatic changes in the coating's conductivity. Furthermore, differences in particle size and shape can cause wide variations in conductivity at even a constant weight loading. Moreover, the percolation threshold approach requires relatively high concentrations of conductive particles. At these concentrations, the coatings tend to become brittle, wherein the mechanical properties becoming controlled by carbon black rather than the polymer matrix.

Another approach to conductive coatings is to molecularly dope a polymer matrix with mixtures of a neutral charge transport molecule and its radical cation or anion. "Molecular doping" refers to the relatively low amounts of dopant added, as compared to carbon black dispersions, to increase the conductivity of the polymer matrix, and suggests that the resulting mixture is essentially a solid solution. No chemical bonding occurs between the dopant and the charge transport molecule so as to produce a new material or alloy. That is, the polymer matrix is rendered mechanically stable with a controlled conductivity by molecular doping with dopants such as oxidizing agents. In the presence of an oxidizing dopant, the partially oxidized charge transport moieties in the charge-transporting polymer act as hole carrier sites, which transport positive charges or "holes" through the unoxidized charge transport molecules. As an example, Mort et al., *J. Electronic Materials*, 9:41 (1980), disdose the possibility of chemically controlling dark conductivity by codoping a polycarbonate with neutral and oxidized species of the same molecule, tri-p-tolylamine, that is, TTA and TTA$^+$ respectively, where TTA$^+$ represents a cation radical salt of TTA.

Coating compositions of the present invention have electrical conductivities in the range of about 1.0 to about $10^{-10}$ S/cm and are also useful in various applications such as: thin film transistor devices, see Dodabalapur et al., U.S. Pat. No. 5,574,291, and Tsumura; A. et al., U.S. Pat. No. 5,500,537; in electroluminescent devices, EP 686662-A2, U.S. Pat. Nos. 5,514,878, and 5,609,970, and A. J. Heeger, "Self-assembled Networks of Conducting polyaniline" in *Trends in Polymer Science*, 3, 39–47, 1995); in liquid crystal displays, U.S. Pat. Nos. 5,619,357 and 5,498,762; in electrochromic devices, U.S. Pat. Nos. 5,500,759, and 5,413, 739; in photochromic devices, U.S. Pat. No. 5,604,626; in rechargeable batteries, U.S. Pat. Nos. 4,987,042 and 4,959, 430; in secondary cells, U.S. Pat. Nos. 5,462,566 and 5,460,905; in electrochemical capacitors, U.S. Pat. Nos. 5,527,640, 4,910,645, 5,442,197 and 5,626,729; in photovoltaic cells, U.S. Pat. No. 5,482,570; in photodetectors, U.S. Pat. No. 5,523,555; in photosensitive imaging member, U.S. Pat. Nos. 5,616,440 and 5,389,477; in photographic coatings, U.S. Pat. No. 5,443,944; in formation of conductive polymer patterns, U.S. Pat. No. 5,561,030; in electroplating, U.S. Pat. Nos. 5,415,762, 5,575,898 and 5,403,467; in laser applications, Katulin, V. A. et al., *Sov. J. Quantum Electron.*, 14, 74–77 (1984), Hide et al., *Science* 273, 1833, (1996); and Tessler, et al., *Nature*, 382, 695 (1996); in polymer grid triodes, U.S. Pat. No. 5,563,424; in anticorrosion coatings, U.S. Pat. Nos. 5,532,025 and 5,441, 772; in ferromagnetic or high magnetic spin coatings, Shiomi et al., *Synthetic Metals*, 85, 1721–1722 (1997), and references cited therein. The disclosures of the aforementioned references are totally incorporated herein by reference.

PRIOR ART

Limburg et al., U.S. Pat. No. 4,338,222, disclose an electrically conducting, three-component composition comprising: a polymer matrix; an organic hole transport compound, particularly tetraaryl diamines, and oxidized species of the same molecule, which is the reaction product of the organic hole transport compound and an oxidizing agent capable of accepting one electron from the hole transport compound. Representative coatings of this invention were found to be electrically and mechanically unstable under ambient conditions, for example, ferric chloride doped coatings were very brittle with unstable conductivity.

Hays et al., U.S. Pat. Nos. 5,300,339 and 5,448,342 disclose an overcoating comprising at least three constituents: a charge transport compound, particularly an aryl diamine, a polymer binder, particularly a polycarbonate or a polyethercarbonate, and an oxidizing agent. The coatings in these patents are believed to be based on the composition disclosed in U.S. Pat. No. 4,338,222, and representative coatings were found to be unstable electrically and mechanically under ambient condition, for example, coatings were very brittle with unstable conductivity.

Hays et al., U.S. Pat. No. 5,386,277, discloses an overcoating comprising two constituents: a charge transport polymer with tetraaryl diamine units contained in the main chain and an oxidant. Representative coatings were found to be unstable electrically and mechanically under ambient condition, for example, ferric chloride doped coatings were very brittle with unstable conductivity.

Hsieh et al., U.S. Pat. No. 5,587,224 discloses the use of photoacids as photooxidants for overcoating with two or three constituents. Representative coatings of this invention were found to be stable electrically and mechanically under ambient conditions. However, the electrical properties of the coatings were not stable under elevated temperature and elevated humidity conditions.

Fukushima et al., U.S. Pat. No. 5,549,851, discloses conductive coatings with three constituents: an aryl amine charge transport molecule, polysilane binder and an oxidant. Polysilane binders are known to decompose upon light exposure. It is also particularly difficult to prepare thick coating films of polysilanes, for example, about 30 micron. Representative coatings were found to be unstable electrically and mechanically under ambient condition, for example, ferric chloride doped coatings were very brittle with unstable conductivity.

The disclosures of each of the aforementioned patents are totally incorporated herein by reference.

SUMMARY OF THE INVENTION

Embodiments of the present invention, include:

overcoming, or minimizing deficiencies of prior art compositions and processes, by, for example, proving compositions with superior stability properties;

providing conductive polymer coating compositions comprising an arylamine charge transport molecule, an oxidized form of an arylamine charge transport molecule, and a polymer binder, and optionally containing alkaline anti-corrosion additives and voltage stabilizing additives;

providing a printing machine comprising an imaging member comprised of the aforementioned conductive polymer coating as illustrated herein;

providing a simple manufacturing process for the preparation of conductive coatings;

providing conductive coatings with stable conductivity under a wide range of environmental conditons, for example, conductive coatings with controlled and reproducible conductivity in the range of about 1.0 S/cm to about $10^{-12}$ S/cm;

providing conductive coatings with controlled conductivity which conductivity is not limited by percolation; and providing pinhole free conductive coatings with high dielectric strength, with high mechanical stability and wear resistance, with controlled conductivity, with low surface energy, and which coatings can protect metal substrates from oxidation or corrosion, for the aforementioned device applications.

DETAILED DESCRIPTION OF THE INVENTION

The present invention provides electrically and mechanically stable conducive polymer coatings comprising an arylamine charge transport compound, an oxidized arylamine charge transport compound salt, and a polymer binder. In embodiments, the oxidized arylamine charge transport compound salt comprises the oxidation product arising from the self-same arylamine charge transport compound. In other embodiments, the oxidized arylamine charge transport compound salt is formed from a compound other than the arylamine charge transport compound.

The oxidized arylamine charge transport compound salt, in embodiments, can be formed in situ from the arylamine charge transport compound. Alternatively, the oxidized arylamine charge transport compound salt can be formed ex situ from the arylamine charge transport compound or from a different arylamine charge transport compound.

The oxidized arylamine charge transport compound salt comprises an oxidized form of an arylamine charge transport compound and a counter ion, for example, hexafluoroantimonate and hexafluoroarsenate, which hexafluoro- salts are preferred counter anions.

Preferred arylamine charge transport molecules, either monomolecular or as incorporated into polymeric structures, are para-substituted arylamine charge transport compounds. Oxidation of the transport molecule can be accomplished by known chemical oxidizing reagents or can be an oxidation process accomplished, for example, chemically, photochemically, or electrochemically. Oxidizing compounds can be, for example, known chemical oxidants including ionic salts, Brønsted acids, halogens, Lewis acids, and mixtures thereof. Ionic salts include $AgSbF_6$, $AgASF_6$, $AgPF_6$, $AgBF_4$, $AgBr$, $AgI$, $AgF$, $AgCl$, $O_2SbF_6$, $O_2AsF_6$, $NOSbF_6$, $NOAsF_6$, $NO_2SbF_6$, $NO_2AsF_6$, $(CH_3CH_2)O^+(CF_3SO_3)Al^-$, $(CH_3CH_2)O^+(CF_3SO_3)Ga^-$, $(CH_3CH_2)O^+(CF_3SO_3)B^-$, $CH_3(C=O)^+(CF_3SO_3)Al^-$, and the like, and mixtures thereof. Brønsted acids include sulfonic adds, phosphoric acids, carboxylic acids, and the like, and mixtures thereof. Lewis acids include for example, $AlCl_3$, $GaCl_3$, $SnCl_4$, $BF_3$, $FeCl_3$, $AsF_3$, $SnCl_4$, $ZrCl_4$, $ZnCl_2$, $TiCl_4$, $AuCl_3$, $CuCl_2$, $VCl_3$, $InCl_3$, $TaCl_5$, $SbF_5$, and the like, and mixtures thereof. The oxidant can be a sublimable material, such as, $O_2SbF_6$, $O_2SbF_6$, $O_2AsF_6$, $NOSbF_6$, $NOAsF_6$, Lewis acids, carboxylic acids, squaric acids, quinones, quinone dimethanes, carbon 60 cage and related fullerane compounds, and mixtures thereof. Photo-oxidants include, for example, diphenyliodonium salts and diarylsulfonium salts.

The conductive coatings of the present invention have conductivities of about $10^{-12}$ to about 1.0 S/cm, which conductivity is controlled by the concentrations of the oxidant and the charge transport units contained in the coatings. The conductive coatings of the present invention using, for example, the aforementioned oxidants exhibited excellent electrical stability compared to conductive coatings prepared with other oxidants and as illustrated herein. The conductive polymer coatings, in embodiments of the present invention, have electrical conductivities and mechanical stabilities that can be retained or maintained for an extended time, for example, from about 8 to about 10 weeks at a temperature of, for example, about 85 to about 100° C. and in a relative humidity of about 50 to about 100 percent.

In embodiments, the coating compositions can additionally include optional additives such as an alkaline anti-corrosion additive, and a voltage stabilizing additive. Examples of alkaline anti-corrosion additive include, heterocyclic compounds with at least one nitrogen heteroatom, metallocene compounds, and mixtures thereof, for example, 2-(4-biphenylyl)-5,6-phenyl oxazole, 1,4-dichlorophthalazine, 1-phenyl pyrazole, di-pyridyl anthracenes, 1-phenyl-imidazole, 3methyl-1-phenyl-pyrazole, 2,4,6-triphenyl-1,3,5triazine, 2,6-di-t-butylpyridine, 4,7-diphenyl-1,10-phenanthroline, 2,6-bis(chloromethyl)pyridine, 2,5-diphenyl oxazole, 2,4,6-triphenoxy-1,3,5-triazine, 8-hydroxyquinoline aluminum, ferrocene, mixtures thereof, and the like. Many of the aforementioned heterocylic compounds are known electron transport materials.

Examples of voltage stabilizing additives include substituted aromatic hydrocarbons of the formula Ar(X)n wherein Ar is an aryl group with, for example, from 6 to 24 carbon atoms, X is a substituent selected from the group consisting of —H, —F, —Br, —Cl, —I, —NO$_2$, —SO$_2$—R, wherein R is alkyl group with from 1 to about 20 carbon atoms or an aryl group with from 6 to about 24 carbon atoms, and n is an integer from 1 to about 20, such as known aromatic hydrocarbon compounds, halogenated aromatic compounds, nitro aromatic compounds, sulfone aromatic compounds, cyano aromatic compounds, and mixtures thereof, for example, naphthalene, anthracene, phenanthrene, pyrene, 1,4-dichloronaphthalene, nitroanthracenes, 4,4'-dibromobiphenyl, 4-nitrobiphenyl,. cyanobiphenyl, 2-nitroaniline, 9,10'-dibromoanthracene, benzophenone, diphenylsulfone, o-quinones, p-quinones, tetracyanoquinondimethane, 1,1'-biquinones, 9-dicyanornethylene fluorene, mixtures thereof, and the like.

Inert polymer binder materials include, but are not limited to solvent processable and melt processable thermoplastics and elastomeric thermoplastics such as polystyrenes, polycarbonates, polyesters, polyimides, polyurethanes, polysulfones, polyethersulfones, polyether ketones, polyamides, and the like, and their copolymers and polymer blends.

The polymer binder, in embodiments, can be an inert polymer, one or more, for example up to about 5, charge transport polymer, and mixtures thereof, and selected in an amount of about 30 to about 80 weight percent of the total weight of the coating. When the polymer binder selected is a polymeric charge transport compound examples thereof include polyvinylcarbazoles, polythiophenes, polysilanes, polyanilines, poly(phenylene vinylenes), polyphenylenes, poly(phenylene sulfides), polyanilines, poly(phenylene sulfide phenylenamine), copolymers thereof containing triarylamine charge transport groups, and mixtures thereof. In a preferred embodiment, the arylamine charge transport compound is a para-subsbtuted arylamine charge transport material, including polymers having para-substituted arylamine charge transport molecules molecularly doped therein, for example, in amounts of from about 20 to about 70 weight percent based on the total weight of the coating, and charge transport polymers containing para-substituted arylamine groups, that is, covalently bound arylamine groups in a main or pendant polymer chain, and mixtures thereof.

The charge transport polymers include but are not limited to polyvinylcarbazoles, polythiophenes, polysilanes, polyanilines, poly(phenylene vinylenes), polyphenylenes, poly(phenylene sulfides), polyanilines, poly(phenylene sulfide phenylenamine), and polymers containing arylamine charge transport groups. The arylamine charge transport compound is preferably a para-substituted arylamine charge transport material selected from the group of para-substituted arylamine charge transport compounds, molecularly doped polymers having para-substituted arylamine charge transport molecules, charge transport polymers containing para-substituted arylamine groups, and mixtures thereof.

The arylamine charge transport compound can be of the alternative formulas:

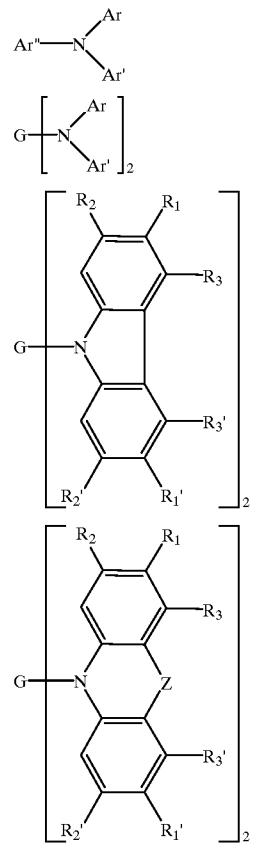

wherein Ar, Ar', and Ar" are independently selected from unsubstituted and substituted aromatic groups with from 6 to about 30 carbon atoms, for example, phenyl, 3-methylphenyl, 4-methylphenyl, 3,4-dimethylphenyl, 4-ethylphenyl, 4-t-butylphenyl, 4-methoxyphenyl, 4-bromophenyl, 4-chlorophenyl, 3-iodophenyl, 4-flourophenyl, 4-phenylphenyl, 2-naphthyl, 1-naphthyl, and the like, and mixtures thereof, and $R_1$, $R_2$, $R_3$, $R_1'$, $R_2'$, and $R_3'$ are independently selected from the group consisting of hydrogen, bromine, chlorine, fluorine, alkyl groups with from 1 to about 24 carbon atoms, and is alkoxy groups with from 1 to about 24 carbon atoms, Z is selected from the atoms O, S, Se, or a substituent —CH$_2$—, G is an alkaline group with 1 to about 12 carbon atoms or a group selected from the partial formulas:

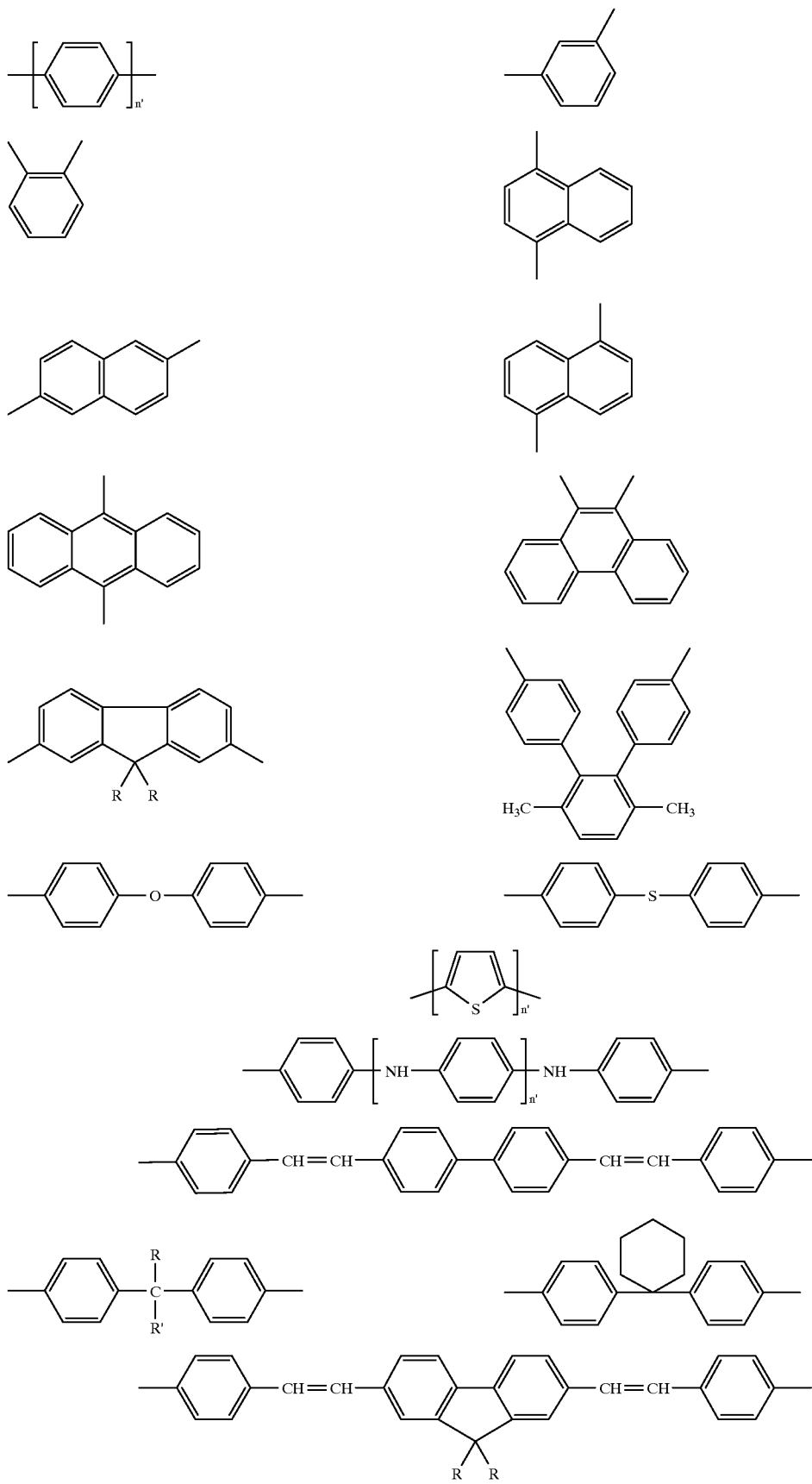

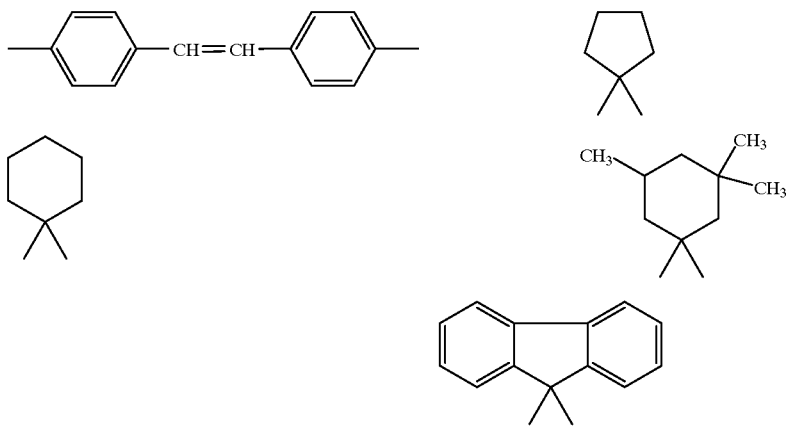

wherein n' is an integer of from 1 to about 12, and R and R' are alkyl groups with, for example, 1 to about 12 carbon atoms.

The arylamine charge transport compound can include the following arylamine compounds and mixtures thereof, a) aryldiamine compounds of the formula:

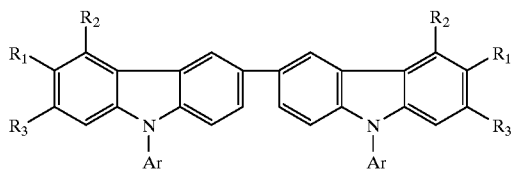

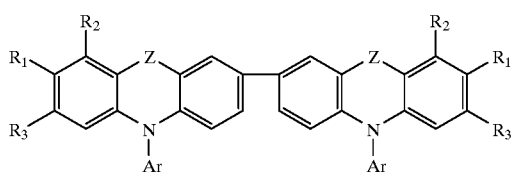

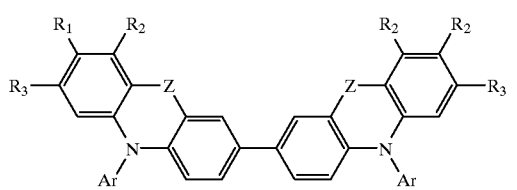

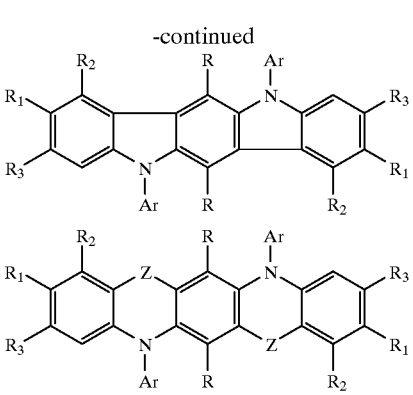

wherein Ar is a substituted or unsubstituted aromatic group, for example, phenyl, 3-methylphenyl, 4-methylphenyl, 3,4-dimethylphenyl, 4-ethylphenyl, 4-t-butylphenyl, 4-methoxyphenyl, 4-bromophenyl, 4-chlorophenyl, 3-iodophenyl, 4-flourophenyl, 4-phenylphenyl, 2-naphthyl, 1-naphthyl, and the like, and mixtures thereof, $R_1$, $R_2$ and $R_3$ are independently selected from the group consisting of hydrogen, bromine, chlorine, fluorine, alkyl groups with from 1 to about 24 carbon atoms, such as methyl, ethyl, butyl, isobutyl, and the like, and alkoxy groups with from 1 to about 24 carbon atoms, such as methoxy, ethoxy, isobutoxy, and the like, and Z is selected from an atom O, S, Se, or a methylene substituent —$CH_2$—;

b) aryltriamines compounds of the formula:

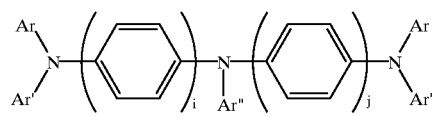

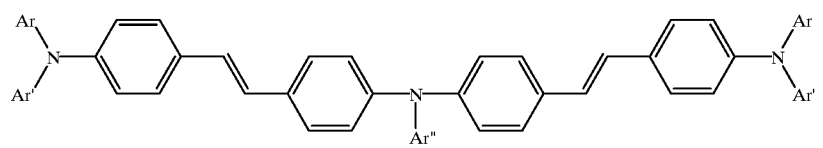

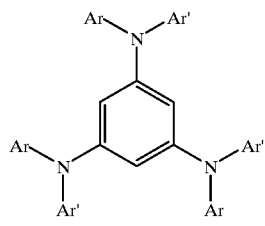
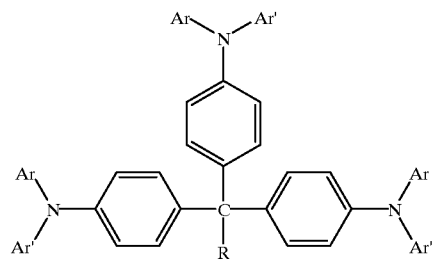
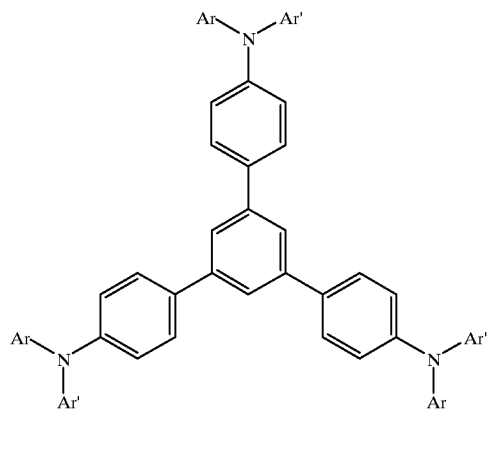
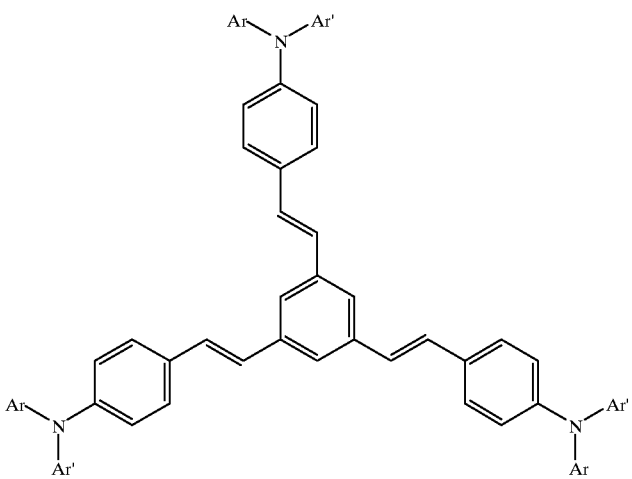
wherein Ar and Ar' are independently selected from substituted and unsubstituted aromatic groups, R is selected from hydrogen, phenyl containing 6 to about 20 carbon atoms and alkyl groups containing 1 to about 12 carbon atoms, such as methyl, ethyl, butyl, isobutyl, and the like, and wherein i and j are integers from 1 to about 2;
c) aryltetraamines compounds of the formula:
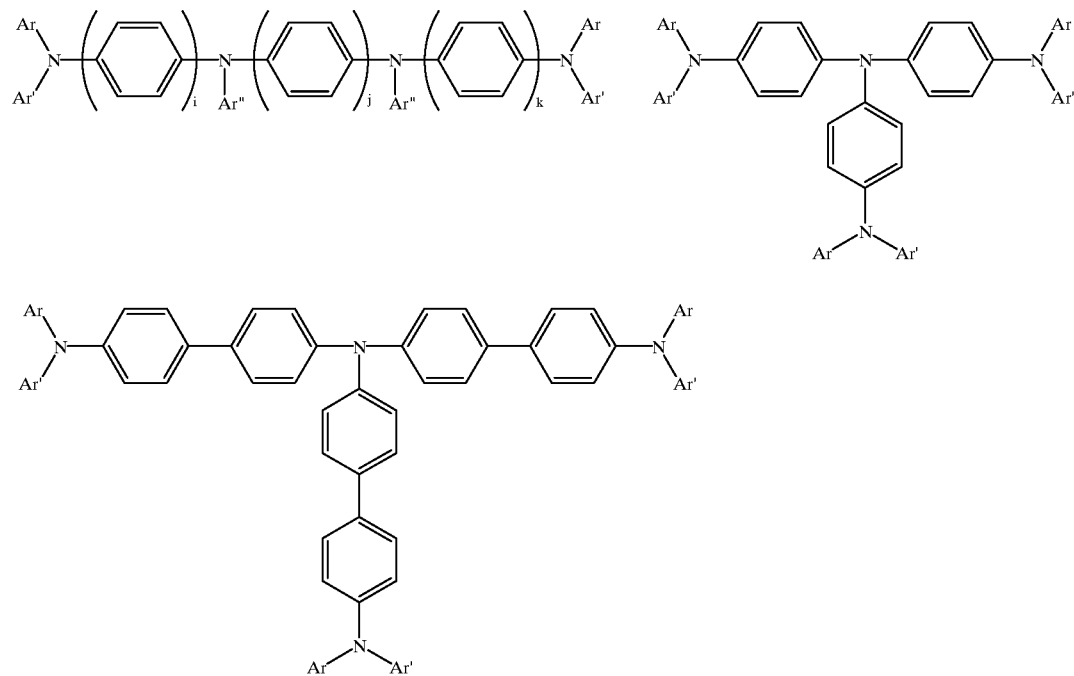

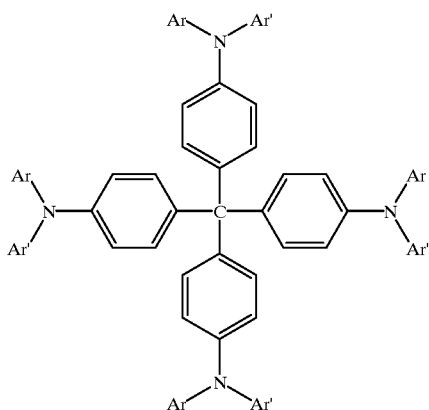

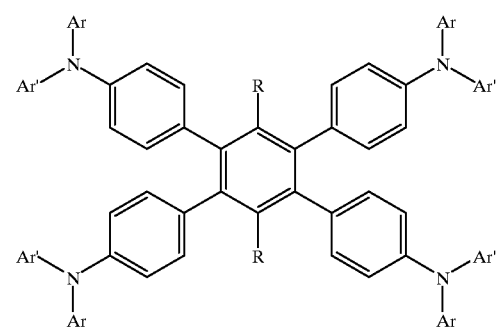

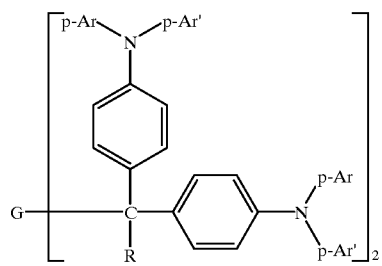

wherein Ar, Ar', and Ar" are independently selected from substituted and unsubstituted aromatic groups with from 6 to about 20 carbon atoms, p-Ar and p-Ar' are independently selected from para-substituted aromatic groups with from 6 to about 20 carbon atoms, R is selected from hydrogen, phenyl with from 6 to about 20 carbon atoms and alkyl groups containing 1 to about 12 carbon atoms, such as methyl, ethyl, butyl isobutyl and the like, i, j, and k are integers 1 or 2, G is an alkaline group with 1 to about 12 carbon atoms or a group selected from the partial formulas:

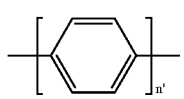

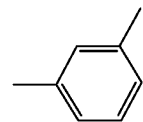

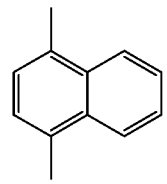

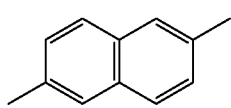

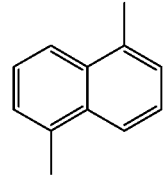

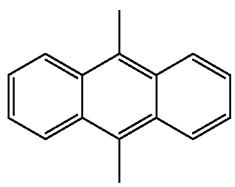

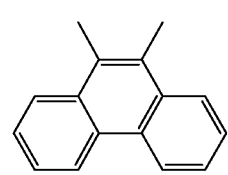

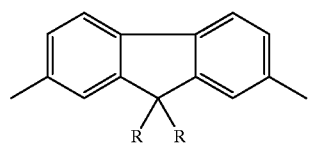
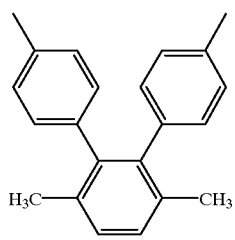
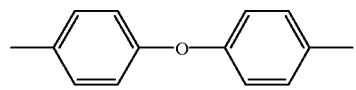
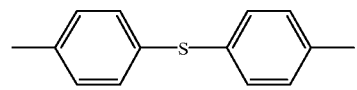
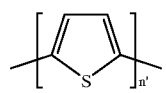
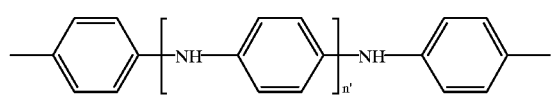
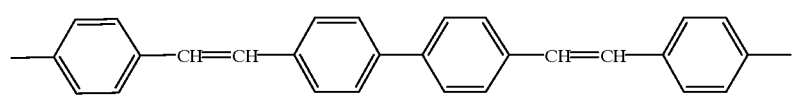
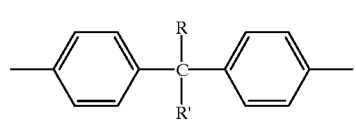
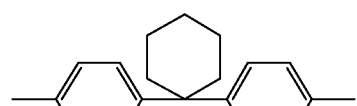
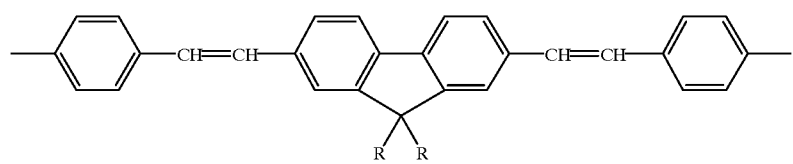
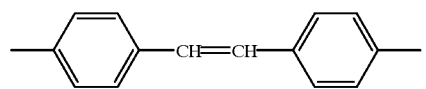
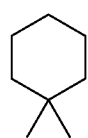
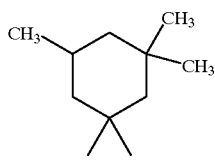
and
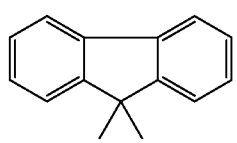

wherein n' is an integer from 1 to about 12, and R and R' are alkyl groups with 1 to about 12 carbon atoms;

d) arylpentaamines compounds of the formula:

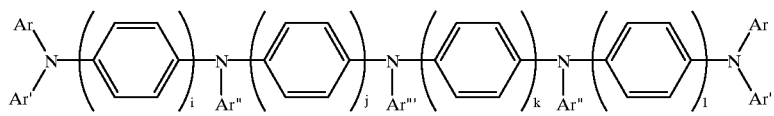

wherein Ar, Ar', Ar", and Ar'" are independently selected from substituted and unsubstituted aromatic groups with from 6 to about 20 carbon atoms, and i, j, k, and l are integers of 1 or 2; and e) arylhexaamines compounds of the formula:

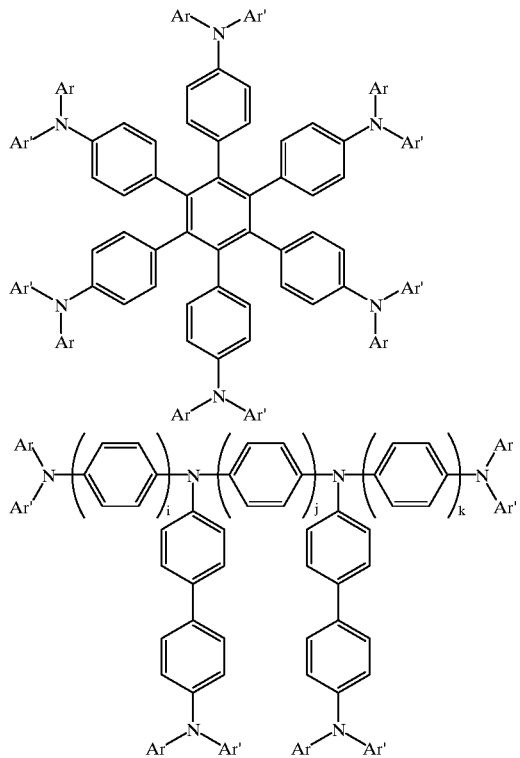

-continued

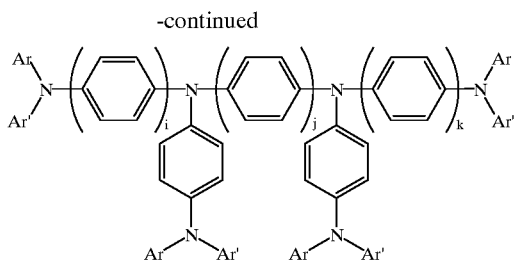

and

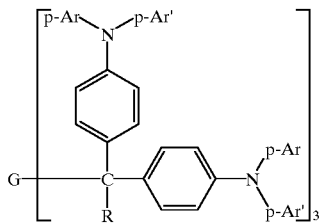

wherein Ar and Ar' are independently selected from substituted and unsubstituted aromatic groups with from 6 to about 20 carbon atons, p-Ar and p-Ar' are para-substituted aromatic groups with from 6 to about 20 carbon atoms, i, j, and k are integers of 1 or 2, G is a alkaline group with 1 to about 12 carbon atoms or an aromatic group selected from the formulas:

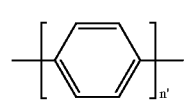

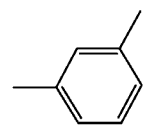

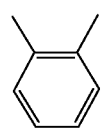

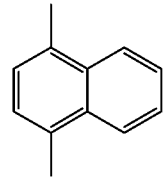

-continued
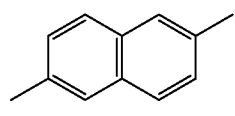 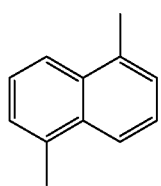
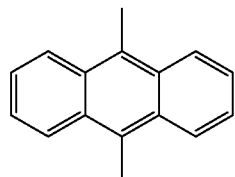 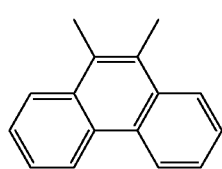
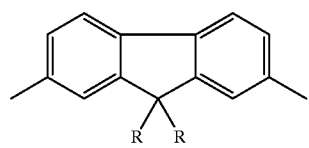 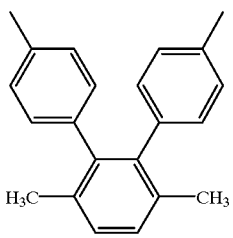
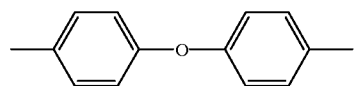 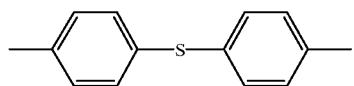
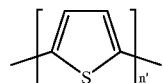
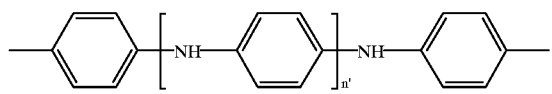
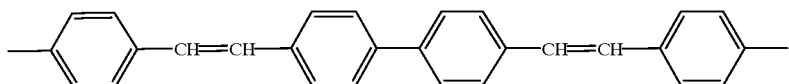
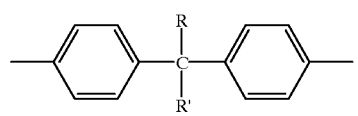 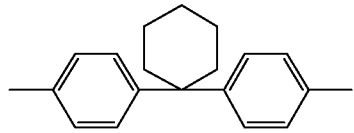
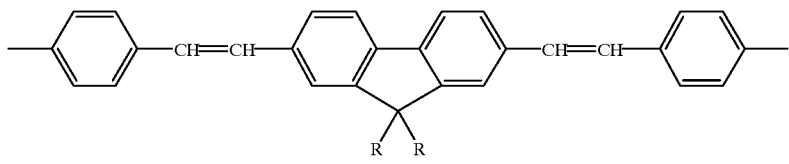
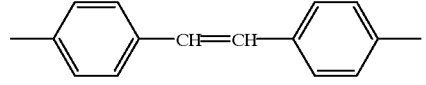 
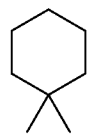 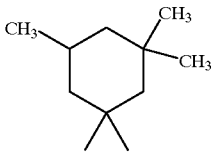
and

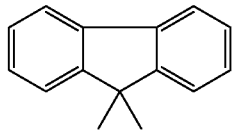

wherein n' is an integer from 1 to about 12, and R and R' are alkyl groups with 1 to about 12 carbon atoms, such as methyl, ethyl, butyl, isobutyl, and the like.

The arylamine charge transport compound can be para-substituted triarylamine compounds with at least one of the para-substituted molecular segments selected from the partial formulas:

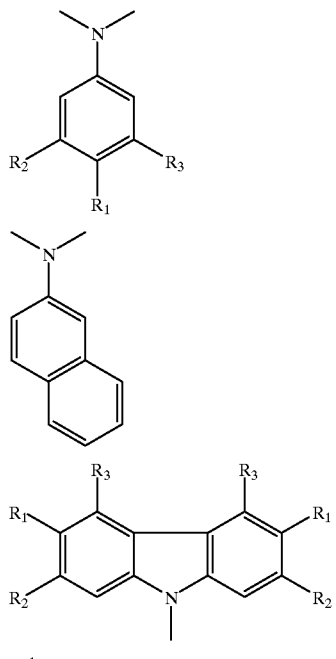

and

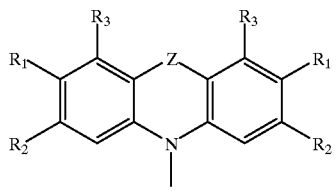

wherein $R_1$ is selected from the group consisting of bromine, chlorine, fluorine, alkyl groups with from 1 to about 24 carbon atoms, such as methyl, ethyl, butyl, isobutyl, and the like, and alkoxy groups with from 1 to about 24 carbon atoms, such as methoxy, ethoxy, butoxy, isobutoxy, and the like, $R_2$ and $R_3$ are independently selected from the group consisting of hydrogen, bromine, chlorine, fluorine, alkyl groups with from 1 to about 24 carbon atoms, such as methyl, ethyl, butyl, isobutyl, and the like, and alkoxy groups with from 1 to about 24 carbon atoms, such as methoxy, ethoxy, butoxy, isobutoxy, and the like, and Z is an atom of O, S, Se, or a methylene substituent —$CH_2$—.

A preferred charge transport polymer, in embodiments, is selected from polymers that contain a para-substituted aryidiamine unit of the formula:

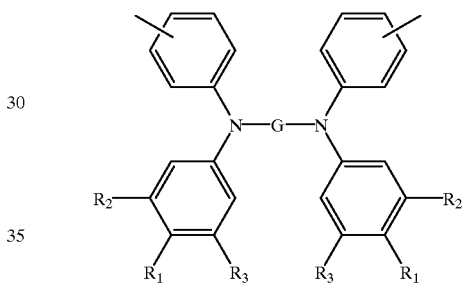

wherein $R_1$ is selected from the group consisting of bromine, chlorine, fluorine, alkyl groups containing from 1 to about 24 carbon atoms, such as methyl, ethyl, butyl, isobutyl, and the like, and alkoxy groups containing from 1 to about 24 carbon atoms, such as methoxy, ethoxy, butoxy, isobutoxy, and the like, $R_2$ and $R_3$ are independently selected from the group consisting of hydrogen, bromine, chlorine, fluorine, alkyl groups containing from 1 to about 24 carbon atoms, such as methyl, ethyl, butyl, isobutyl, cyclohexyl, and the like, and alkoxy groups containing from 1 to about 24 carbon atoms, such as methoxy, ethoxy, butoxy, isobutoxy, and the like, G is selected from the group consisting of alkaline groups of 1 to 12 carbon atoms and of the formulas:

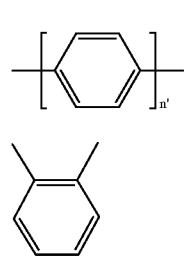

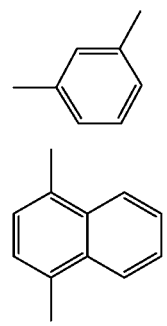

-continued
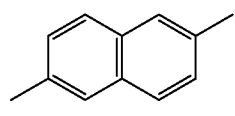 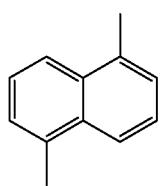
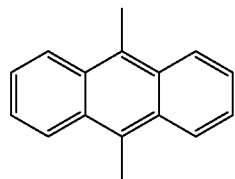 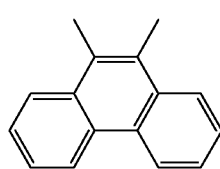
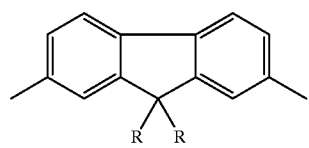 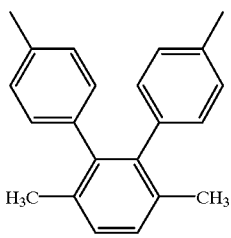
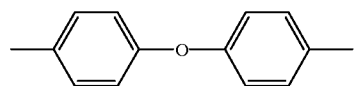 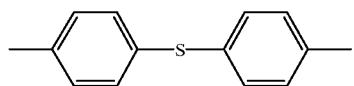
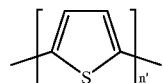
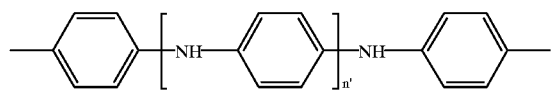
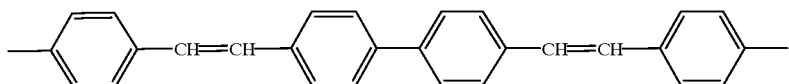
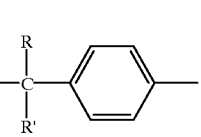 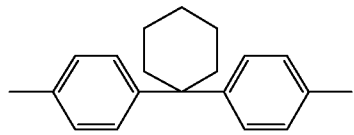
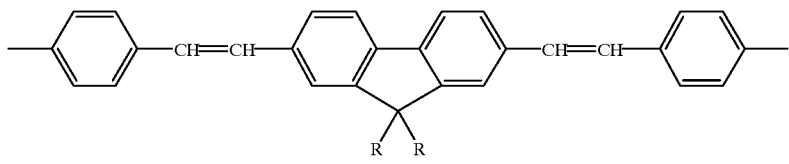
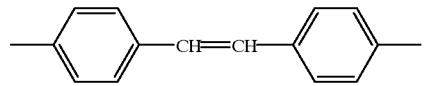 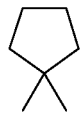
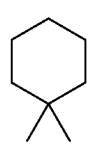 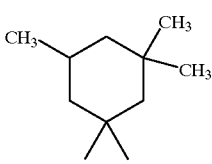
and

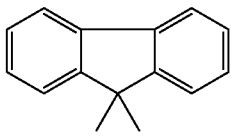

wherein n' is an integer from 1 to about 12, and R and R' are alkyl groups with 1 to about 12 carbon atoms, such as methyl, ethyl, butyl, isobutyl, cyclohexyl, and the like.

A preferred para-substituted arylamine charge transport compound is of the formula:

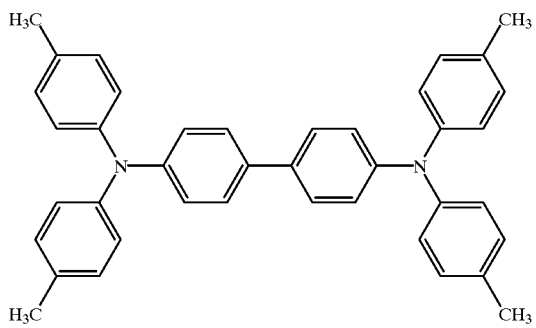

wherein the oxidized form of the para-substituted arylamine charge transport compound results from photo-oxidabon with photo-oxidants such as diphenyliodonium salts and diarylsulfonium salts.

The present invention provides conductive polymer coatings comprising a para-substituted arylamine charge transport compound, and an oxidizabon product of the para-substtuted arylamine charge transport compound and an oxidizing agent or salt The coating composition can further comprise optional additives, such as, an alkaline anticorrosion compound, a voltage stabilizing compound, and a polymer binder.

In embodiments, the coatings provided are useful in various charge transport and electron transport applications and devices, for example, as a thin film electrode or contact modification layer in electroluminescent devices to facilitate charge injection.

The present invention provides a process for the preparation of a conductive polymer coating comprising:

mixing an arylamine charge transport molecule, and oxidant, optional additives and a polymer binder in a solvent, preferably until complete solubilization of the polymer is achieved, to produce a coating mixture;

depositing the conductive polymer coating solution mixture on a substrate, for example, by spin coating, flow coating, spray coating, dip coating, web coating and the like; and drying the coated substrate, for example, at from about 25 to 150° C.

The preparative process is preferably accomplished by removing any precipitated particles arising from, for example, the reaction of the oxidant and the arylamine charge transport molecule in the coating mixture, and thereafter dissolving a polymer binder and optional additives in the coating solution to provide a coating solution that is free of particulate matter. The coatings can have a thickness of, for example, from about 0.01 cm to about 0.5 cm, and conductivities of from about $10^{-12}$ to about 100.0 S/cm and which conductivity is highly stable over a broad relative humidity range of from about 0 to about 100 percent. The improved conductivity stability is maintained, for example, from about 60 to about 90 days, at substantially higher temperatures, and at higher humidity values compared to control materials and as illustrated herein. The improved conductivity and humidity stability performance represent a stability improvements, for example, from about 4 to about 8 fold.

In alternative embodiments, the preparative process can be accomplished by mixing the components of the composition in an extruder for achieving uniform mixing and dispersion followed by a coating step as illustrated herein.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

In the following examples the following four representative charge transport molecules were used:

N,N'-diphenyl-N,N'-di-(m-tolyl)-(1,1'-biphenyl)4,4'-diamine, hereinafter referred to as m-TPD;

N,N'-diphenyl-N,N'-di(p-tolyl)-(1,1'-biphenyl)-4,4'-diamine, hereinafter referred to as p-TPD;

N,N'-di-p-tolyl-N,N'-p-ethylphenyl-1,1'-biphenyl-4,4'-diamine, hereinafter referred to p-DE-TPD; and N,N,N', N'-tetra-p-tolyl-(1,1'-biphenyl)-4,4'-diamine, hereinafter referred to as TM-TPD.

Both M-TPD and p-TPD are commercially available from H.W. Sands Corp. as Catalogue Nos. ST16/1 and ST16/3, respectively. The synthesis of TM-TPD is given in Example I. P-DE-TPD was also analogously prepared according to the procedure given in Example I. Silver trifluoroacetate (AgTFA), iodine ($I_2$), bis(p-t-butylphenyl)iodonium hexafluoroarsenate, hereinafter referred to as photoacid, silver hexafluoroantimonate ($AgSbF_6$), nitrosonium hexafluoroantimonate ($NOSbF_6$) were used as oxidants. The synthesis of the photoacid is disclosed, for example, in the U.S. Pat. No. 5,587,224, while the other oxidants are commercially available. Polymer binders include MAKROLON® a polyester commercially available from Bayer Corp. and PCZ-200 a polycarbonate derived from bisphenol Z, and is commercially available from Mitsubishi Chemical Corp.

EXAMPLE I

Preparation of N,N,N',N'-tetra-p-tolyl-biphenyldiamine (TM-TPD)

Syntheis of 4'-mthyacetanlide:

Into three neck round bottom flask (5 L) equipped with a mechanical stirrer, a condenser, and an addition funnel, were added p-toluidine (995 g, 9.3 mol) and hexanes (1.6 L). Acetic anhydride (960 mL, 10.2 mol) was added dropwise for 2 h enough to reflux, then refluxed for 1 h and cooled to room temperature to give a brown solid. This was collected by suction filtration, transferred into a beaker, and washed with water (2 L) for 30 min. The filtration and washing procedures were repeated. The wet white crystals were air dried for 7 days to provide N-(4-methylphenyl)acetamide (1,343 g, 97% yield). Melting point: 150–152° C. (lit. 153° C., Merck index. 11, 67;).

Synthesis of N,N-Di-p-tolylamine

To a round bottom flask (3 L) equipped with a condenser a Dean-Stark trap, a mechanical stirrer, and an argon-outlet with a thermometer, was added 4'-methylacetanilide (448 g, 3.0 mol), 4-iodotoluene (746 g, 3.4 mol, from Aldrich), potassium carbonate (830 g, 6.0 mol), copper sulfate (20 g), and toluene (50 mL). The reaction mixture was heated at 210° C. for 24 hours in an oil bath. The resulting solution was decanted to a round bottom flask (5 L) and the remaining solid was washed with hot ethanol (3×500). To the combined mixtures were added potassium hydroxide (340 g) and water (400 mL) and then refluxed for 24 h. To resulting solution was added concentrated HCl (400 mL) dropwise followed by toluene (1,000 mL). The mixture was refluxed for 10 min. The hot organic layer (top) was separated, washed with a hot water (500 mL×2), and concentrated under reduced pressure. The resulting solid was recrystallized from the mixture of toluene (100 mL) and hexanes (700 mL). The obtained wet crystals were ground with a mortar and pestle, filtered, washed with hexanes (100 mL), and dried in air for 24 hours to give brown crystals (360 g, 6 mol). The filtrate was concentrated under reduced pressure and recrystallized from the mixture of toluene (20 mL) and hexanes (150 mL) to give a brown solid (120 g, second crop). The combined solid was distilled at 165 oC. and 1 Torr to give a white solid (445 g) while the forerun first portion (15 g, distilled at 65–80°C. and 1 Torr) was discarded. The white solid was recrystallized from hexanes (500 mL) to give a white solid (422 g, 71% yield). Melting point: 80–82° C. (lit. 79°∞ C. TCl catalog) $^1$H-NMR (CDCl$_3$): 7.04 (d, 4H), 6.93 (d, 4H), 5.45 (s, br, 1H), 2.33 (s, 6H) ppm. Note that when iodotoluenes from Oakwood Product Inc., or Charkit Chemical Inc., were used, the above reaction was very slow. Three portions of CuSO$_4$ (50 g) was added every 10 hours and the reaction was completed in 40 hours (over 95% conversion of 4'-methylacetanilide). During work-up after hydrolysis, suction filtraton was required to remove copper residues.

Synthesis of N,N,N',N'-tetra-p-tolyl-1,1'-biphenyl)-4,4'-dlamine (TM-TPD)

To a round bottom flask (5 L) equipped with a condenser a Dean-Stark trap, a mechanical stirrer, and an argon-outlet with a thermometer, was added 4,4'-diiodobiphenyl (DIB, 406 g, 1.0 mol), N,N-di-p-tolylamine (417 g, 2.1 mol), potassium hydroxide (448 g, 8.0 mol), and toluene (300 mL). After adding 1,10-phenanthroline (9.0 g) and CuCl (1.5 g) at 130oC., the mixture was vigorously refluxed at 137° C. After adding another portion of CuCl (3.5g), a very exothermic reaction occurred. The reaction mixture was further heated at 130° C. for 4 hours. To the reaction mixture, was added water (400 mL), toluene (400 mL), and acetic acid (400 mL). The resulting solution was washed with water (2 L) by gentle swirling in a 6 L separatory funnel and the top layer was separated and collected. The aqueous layer was suction-filtered and residue was washed with toluene (300 mL) and top layer was separated. After combining organic layers, the washing process was repeated once again. The dark organic solution was concentrated under reduced pressure and the resulting solution was chilled in freezer for 1 hour to yield a brown solid. After filtering, the brown solid was washed with acetone (3×400 mL) and dried in oven at 45° C. and 10 Torr. To a round bottom flask (2 L) equipped with a condenser, a mechanical stirrer, an argon-outlet with a thermometer, and heating mantle was charged the crude product (350 g) and a neutral alumina (200 g) and toluene (1 L). The mixture was heated at 90° C. for 2.5 hour. The resulting yellow solution was filtered through a preheated Buchner funnel. The residue on alumina was extracted with hot toluene (350 mL×2) and the organic layers combined. After concentrating the combined yellow solution in vacuo, the resulting pale yellow solid (350 g) and acetone (400 g) were heated at 60° C. and stirred at 23° C. for 15 hour under argon to give a pale yellow solid. After filtering, washing with acetone (200 mL×3), and drying under reduced pressure for 16 hours, a pure TM-TPD (306 g, 56% yield) was obtained. Melting point: 217–219° C.; $^1$H-NMR (CDCl$_3$): 7.39 (d, 4H), 7.07–7.00 (m, 20H), 2.31 (s, 12H) ppm.

EXAMPLE II

This example describes the preparation of coating solution with different compositions.

Preparation of coatina solution using AgSbF$_6$ as the oxidant with filtration:

m-TPD (32.0 g) and methylene chloride (544 g) were magnetically stirred in a 500 mL bottle until complete solubilization of M-TPD. AgSbF$_6$, in an amount of 1.6 g, 0.5 weight percent with respect to M-TPD as then added. The resulting solution was stirred for 16 hours and the resulting solution was allowed to stand for at least two hours to settle the silver precipitate and used as the stock solution. Alternatively, the silver precipitate can be removed by filtration. Into a 2 ounce bottle was added a portion of the stock solution (72.0 g) and MAKROLON 5705 (7.5 g) and the mixture was shaken for 5 hour to dissolve the MAKROLON and to give a coating solution with the following solid weight percents: MAKROLON (65%), m-TPD (35%) and AgSbF$_6$ in an amount of 5 weight percent with respect to m-TPD. The same stock solution was used to formulate another coating solution as follow: Into a 2 ounce bottle was added a portion of the stock solution (72.0 g), MAKROLON 5705 (7.5 g) and 2-(4-biphenylyl)-5-phenyloxazole (0.12 g) as a anticorrosion additive, and the mixture was shaken for 5 hour to dissolve the MAKROLON and to give a coating solution with the following solid weight percents: MAKROLON (65%), m-TPD (35%/o), AgSbF$_6$ in an amount of 5 weight percent with respect to m-TPD, and 2-(4- biphenylyl)-5-phenyloxazole in an amount of 3 weight percent with respect M-TPD.

m-TPD (16.0 g) and chlorobenzene (229 g) were magnetically stirred in a 250 mL bottle until complete solubilization of m-TPD. $AgSbF_6$ in an amount of 0.8 g, 0.5 weight percent with respect to m-TPD, was added. The resulting solution was stirred 16 hours. The resulting solution was allowed to stand for at least two hours to settle the silver precipitate and used as the stock solution. Into a 2 ounce bottle was added portion of the stock solution (61.5 g) and PCZ 200 ( polycarbonate Z, 7.5 g), and the mixture was shaken for 5 hours to dissolve the MAKROLON and to give a coating solution with the following solid weight percents: PCZ 200 (65%), M-TPD (35%) and $AgSbF_6$ in an amount of 5% with respect to m-TPD.

Coating solutions using other charge transport molecules, polymer binders, solvents, and/or anticorrossion additives at different weight percents were similarly prepared.
Preparation of coating solution using $AaSbF_6$ as the oxidant without removing silver:

a mixture of M-TPD (4.0 g), MAKROLON (7.44 g), $AgSbF_6$ (0.08 g) and methylene chloride (68 g) in an amber bottle was roll milled until complete solubilizabon of the polymer to give a coating solution with the following solid weight percents: Makrolon (65%), m-TPD (35%) and $AgSbF_6$ in an amount of 2 weight percent with respect to m-TPD .
Preparation of coating solution using $NOSbF_6$ as the oxidant:

Into a 500 mL flask equipped with a condenser, a magnetic stirrer and a drying tube were added m-TPD (40.0 g) and methylene chloride (425 g). The mixture was stirred until m-TPD was dissolved and $NOSbF_6$ (2.0 g) was then added. The resulting solution was stirred overnight and transferred into a 500 mL narrow neck bottle to give a stock solution. Into a 4 ounce bottle was added portion of the stock solution (93.4 g) and MAKROLON 3108 (15 g) and the mixture was shaken for 19 hours to dissolve the MAKROLON and to give a coating solution with the following solid weight percents: MAKROLON (65%), m-TPD (35%) and $AgSbF_6$ in an amount of 5 weight percent with respect to m-TPD. A portion of this solution (93.4 g) and MAKROLON 3108 (15.0 g) were shaken
Preparation of coating solution using a photoacid as the oxidant:

Into a 2 ounce bottle was added m-TPD (4.0 g), MAKROLON 3108 (7.44 g), photoacid (0.08 g, 2 weight percent with respect to m-TPD, dioctyl phthalate (0.074 g, as a plasticizer), and methylene chloride (68 g). The mixture was shaken for 20 hours to give a coating solution with the following solid weight percents: m-TPD (35%), MAKROLON 3108 (65%), photoacid (2%), dioctyl phthalate (in an amount of 1 weight percent with respect to MAKROLON).

Into a 2 ounce bottle was added mTPD (4.0 g), MAKROLON 3108 (7.44 g), photoacid (0.08 g, 2 weight percent with respect to m-TPD), polyester PE 200 from DuPont (0.074 g, as the voltage stabilizer), and methylene chloride (68 g). The mixture was shaken for 20 hours to give a coating solution with the following solid weight percents: m-TPD (35%), MAKROLON 3108 (65%), photoacid (2%), and PE 200 (in an amount of 1 weight percent with respect to MAKROLON).

Into a 2 ounce bottle was added m-TPD (4.0 g), MAKROLON 3108 (7.44 g), photoacid (0.08 g, 2 weight percent with respect to m-TPD), polysiloxane fluid (0.074 g, as a low surface energy additive), and methylene chloride (68 g). The mixture was shaken for 20 hours to give a coating solution with the following solid weight percents: m-TPD (35%), MAKROLON 3108 (65%), photoacid (2%), polysiloxane fluid (in an amount of 1 weight percent with respect to MAKROLON).

EXAMPLE III

Coating Deposition: MYLAR (75 microns) substrates with titanium coatings of about 200 to 300 Angstroms were from ICI Inc. Substrates were overcoated with a silane blocking layer (200 to 500 Angstroms derived from 2-aminoisopropyltriethoxylsilane) and then an adhesive layer (200 to 500 Angstroms) of 49K polyester (from DuPont). The resulting substrates were used for depositing the conductive coatings using a Gardner mechanical driven film applicator which is enclosed in a plexiglass box. A substrate was placed on the vacuum plate of the Gardner coater and a size 0.004 Bird film applicator was placed on top of the substrate then coated with a conductive polymer layer using a coating solution prepared as described in Example II. The resulting coating was air dried for I hour and then dried in a forced air oven at 125° C. for 30 min to give a coating with a thickness of about 20–25 microns. In the case of photoacid coatings, UV exposure for 99 seconds was needed to induce the conductivity in the coatings.

Time Constant Measurements:

An Electrodag electrode was painted on the sample for charge relaxation time measurement which involved applying a pulsed voltage to the sample between electrodes. It is generally known to those of ordinary skill in the art that the charge relaxation iffme constant is inversely proportional to the conductivity. Table 1 shows a series of m-TPD/ MAKROLON (35/65) coatings and various oxidants and additives. All the coatings were deposited from methylene chloride. The weight percents of the oxidant and additives with respect to the charge transport molecule are also given. All the samples were stress tested in an environmental chamber of 85% relative humidity (RH) and 50° C. The time constants of the samples were measured at different time intervals to determine the electrical stability of the coatings. As shown in Table 1, the charge relaxation time constants for samples 1 through 8 increase at least by a factor of 3 with respect to their respective initial values after 1 week of stress test. This indicates that the coatings have less than I week of stability and become at least 3 time less conductive. Sample 9 using $AgAsF_6$ shows 1 week of stability, but becomes 5 time more insulatve after 2 weeks. Samples 10 through 13 using $AgSbF_6$ or $NOSbF_6$ as the oxidant show only small change in the charge relaxation time constant indicating very high stability in the conductivity. The stability of the $AgSbF_6$ based coatings is highly reproducible as exemplified by the data for samples 11a and 12a which were coated from coating solutions that had been aged two-months. The improved stability seen for coatings resulting from $AgAsF_6$, $AgSbF_6$ and $NOSbF_6$ was unexpected and not believed to have been previously reported.

TABLE 1

Comparative stability of m-TPD/MAKROLON (35/65) coatings.

| Sample NO. | Oxidant (wt %) & additive (wt %) | As coated | 1 wk | 2 wk | 3 wk | 4 wk | 5 wk | 6 wk | 7 wk | 8 wk |
|---|---|---|---|---|---|---|---|---|---|---|
| | | | Charge relaxation time constant (millisecond) | | | | | | | |
| 1 | TTA.SbCl$_6$ (5%) | 0.43 | 4.50 | — | — | — | — | — | — | — |
| 2 | TTA.SbF$_6$ (5%) | 0.36 | 2.20 | — | — | — | — | — | — | — |
| 3 | TTA.AsF$_6$ (5%) | 0.60 | 3.67 | — | — | — | — | — | — | — |
| 4 | photoacid (2%) | 0.20 | 0.66 | 8.46 | — | — | — | — | — | — |
| 5 | AgTFA (5%) | 0.16 | 4.5 | — | — | — | — | — | — | — |
| 6 | AgTFA (4%)/I$_2$(0.5 eqv. with respect to AgTFA | 0.41 | 1.17 | 2.70 | 3.56 | — | — | — | — | — |
| 7 | AgBF$_4$ (5%) | 2.11 | >100 | — | — | — | — | — | — | — |
| 8 | AgPF$_6$ (5%) | 0.45 | 5.91 | — | — | — | — | — | — | — |
| 9 | AgAsF$_6$ (5%) | 0.21 | 0.22 | 1.49 | — | — | — | — | — | — |
| 10 | AgSbF$_6$ (5%) | 0.27 | 0.25 | 0.37 | 0.45 | 0.50 | 0.56 | 0.70 | 0.78 | 0.80 |
| 11 | AgSbF$_6$ (5%)/2-(4-biphenylyl)-5-phenyl oxazole (1%) | 0.25 | 0.34 | 0.23 | 0.31 | 0.43 | 0.51 | 0.77 | 0.68 | 0.95 |
| 11a | Same as 11 but from a two-month aged coating solution | 0.21 | 0.23 | 0.31 | 0.43 | 0.51 | 0.68 | 0.71 | 0.84 | 0.88 |
| 12 | AgSbF$_6$ (5%)/2,5-di-t-butylpyridine (3%) | 0.36 | 0.50 | 0.66 | 0.66 | 0.63 | 0.78 | 0.69 | 0.82 | 0.89 |
| 12a | Same as 12 but from a two month aged coating solution | 0.47 | 0.49 | 0.54 | 0.64 | 0.50 | 0.51 | 0.75 | 0.83 | 0.85 |
| 13 | AgSbF$_6$ (4%)/AgTFA (2%) | 0.26 | 0.18 | 0.25 | 0.29 | 0.33 | 0.49 | 0.50 | 0.59 | 1.17 |
| 14 | NOSbF$_6$ | 0.16 | 0.11 | 0.13 | 0.17 | 0.23 | 0.24 | 0.20 | 0.25 | 0.23 |

All coatings were deposited from methylene chloride. Where time constant values are not indicated, tests were discontinued for lack of stability.

EXAMPLE IV

As shown in Table 2, samples 16 and 16a having TM-TPD as the charge transport molecules show improved stability over the m-TPD based sample 15 by a of about 2. This example illustrates that coatings resulting from para-substituted charge transport molecule such as TM-TPD show improved stability over non-para-substituted charge transport molecule such as M-TPD. It can be determined from samples 17, 18, 19 and 20 that the order of the stability of the coatings is TM-TPD>p-DE-TPD>p-TPD>m-TPD, indicating that the completely para-substituted compounds, for example, TM-TPD and p-DE-TPD, provide the most stable coatings, followed by those based the 50% para-substtuted p-TPD. Coatings, such as sample 17, derived from the non-para-substituted m-TPD are least stable. Samples 21, 22 and 23 contain a mixture of m-TPD and TM-TPD as the charge transport molecules. It can be seen, that sample 21 which has the highest TM-TPD percentage is the most stable of the three samples; while sample 23 which has the lowest TM-TPD percentage is the least stable.

TABLE 2

Comparative stability of coatings having different charge transport molecules

| Sample NO. | Charge transport molecule (35%)/MAKROLON (65%)/oxidant (2%) AgSbF$_6$ (2%) | As coated | 1 wk | 2 wk | 3 wk | 4 wk | 5 wk | 6 wk | 7 wk | 8 wk |
|---|---|---|---|---|---|---|---|---|---|---|
| | | | Charge relaxation time constant (millisecond) | | | | | | | |
| 15 | m-TPD/AgSbF$_6$ | 0.41 | 0.37 | 0.39 | 0.48 | 0.57 | 0.78 | 0.98 | 1.56 | 1.78 |
| 16 | TM-TPD/AgSbF$_6$ (coating dry at 100° C.) | 0.14 | 0.16 | 0.17 | 0.19 | 0.18 | 0.18 | 0.26 | 0.25 | 0.28 |
| 16a | TM-TPD/AgSbF$_6$ (coating dry at 125° C.) | 0.19 | 0.22 | 0.22 | 0.26 | 0.25 | 0.24 | 0.29 | 0.31 | 0.27 |
| 17 | m-TPD/photoacid | 0.29 | 1.60 | 2.50 | — | — | — | — | — | — |
| 18 | p-TPD/photoacid | 0.20 | 0.54 | 0.77 | 1.45 | 1.88 | 3.94 | — | — | — |
| 19 | p-DE-TPD/photoacid | 0.13 | 0.40 | 0.41 | 0.49 | 0.53 | 0.69 | 1.24 | 1.34 | 1.78 |
| 20 | TM-TPD/photoacid (dried at 100° C.) | 0.20 | 0.15 | 0.26 | 0.30 | 0.34 | 0.42 | 0.58 | 0.66 | 0.87 |
| 20a | TM-TPD/photoacid (dried at 125° C.) | 0.22 | 0.23 | 0.31 | 0.31 | 0.35 | 0.44 | 0.53 | 0.58 | 0.72 |
| 21 | m-TPD/TM-TPD (10/25)/photoacid | 0.21 | 0.23 | 0.26 | 0.66 | 0.40 | 0.56 | 0.87 | 0.95 | 1.34 |
| 22 | m-TPD/TM-TPD (20/15) | 0.33 | 0.37 | 0.52 | 0.98 | 0.91 | 1.23 | 1.78 | 2.78 | 3.25 |
| 23 | m-TPD/TM-TPD (30/5) | 0.50 | 0.66 | 1.02 | 1.24 | 2.48 | — | — | — | — |

All coatings were deposited from methylene chloride.

EXAMPLE V

This example further illustrate that para-substituted charge transport molecules improved stability over non-para-substituted ones. As shown in Table 3, samples based m-TPD with PCZ 200, samples 24 through 28, had very poor electrical stabilities on the order of less than about one week. In contrast, TM-TPD based samples resulting from different coating solvents, samples 29 through 35, are very stable under stress condition over about 8 weeks.

TABLE 3

Comparative stability of coatings.

| Sample NO. | Charge transport molecule (35%)/PCZ (65%)/ photoacid (2%)//solvent | As coated | Charge relaxation time constant (millisecond) | | | | | | | |
|---|---|---|---|---|---|---|---|---|---|---|
| | | | 1 wk | 2 wk | 3 wk | 4 wk | 5 wk | 6 wk | 7 wk | 8 wk |
| 24 | m-TPD//metheylene chloride | 0.44 | 4.07 | — | — | — | — | — | — | — |
| 25 | m-TPD//toluene | 0.58 | 70 | — | — | — | — | — | — | — |
| 26 | m-TPD//THF | 0.54 | 6.91 | — | — | — | — | — | — | — |
| 27 | m-TPD//chlorobenzene | 0.44 | 14.9 | — | — | — | — | — | — | — |
| 28 | m-TPD//THF:chlorobenzene (3:1) | 0.45 | 13.0 | — | — | — | — | — | — | — |
| 29 | TM-TPD//methylene chloride | 0.36 | 0.30 | 0.31 | 0.38 | 0.39 | 0.41 | 0.29 | 0.58 | 0.62 |
| 30 | TM-TPD//THF | 0.48 | 0.38 | 0.43 | 0.53 | 0.56 | 0.62 | 0.84 | 0.92 | 0.99 |
| 31 | TM-TPD//toluene | 0.50 | 0.52 | 0.52 | 0.70 | 0.77 | 0.75 | 0.91 | 0.89 | 0.93 |
| 32 | TM-TPD//1,1,2-trichloroethane | 0.34 | 0.31 | 0.34 | 0.43 | 0.45 | 0.54 | 0.60 | 0.63 | 0.74 |
| 33 | TM-TPD//chlorobenzene | 0.35 | 0.33 | 0.32 | 0.38 | 0.42 | 0.47 | 0.50 | 0.61 | 0.71 |
| 34 | TM-TPD// THF:chlorobenzene (3:1) | 0.28 | 0.34 | 0.29 | 0.26 | 0.29 | 0.24 | 0.22 | 0.21 | 0.22 |
| 35 | TM-TPD/PE200 (3%)// THF:chlorobenzene 3:1 | 0.35 | 0.62 | 0.61 | 0.70 | 0.60 | 0.55 | 0.45 | 0.49 | 0.51 |

Other modifications of the present invention may occur to one of ordinary skill in the art based upon a review of the present application and these modifications, including equivalents thereof, are intended to be included within the scope of the present invention.

What is claimed is:

1. A conductive polymer coating comprising an arylamine charge transport compound, an oxidized arylamine charge transport compound salt, and a polymer binder, wherein the oxidized arylamine charge transport compound salt has a counter anion selected from the group consisting of hexafluoroantimonate and hexafluoroarsenate, and wherein the arylamine charge transport compound is present in amounts of from about 20 to about 70 weight percent based on the total weight of the coating.

2. A conductive polymer coating in accordance with claim 1 wherein the electrical conductivity and mechanical stability of the coating is maintained for about 8 to about 10 weeks at from about 85 to about 100° C. and a relative humidity of about 50 to about 100 percent.

3. A conductive polymer coating in accordance with claim 1 wherein the arylamine charge transport compound is a para-substituted arylamine charge transport material.

4. A conductive polymer coating in accordance with claim 1 wherein the oxidized arylamine charge transport compound salt comprises an oxidation product of said arylamine charge transport compound.

5. A conductive polymer coating in accordance with claim 1 wherein the oxidized arylamine charge transport compound salt is formed in situ from said arylamine charge transport compound.

6. A conductive polymer coating in accordance with claim 1 wherein the oxidized arylamine charge transport compound salt is formed ex situ from a compound other than said arylamine charge transport compound.

7. A conductive polymer coating in accordance with claim 1 further comprising a voltage stabilizing additive comprising a substituted aromatic hydrocarbon of the formula $Ar(X)_n$ wherein Ar is an aryl group with from 6 to 24 carbon atoms, X is a substituent selected from the group consisting of —H, —F, —Br, —Cl, —I, —NO$_2$, —SO$_2$—R wherein R is alkyl group with from 1 to about 20 carbon atoms or an aryl group with from 6 to about 24 carbon atoms, and n is an integer of 1 to about 20.

8. A conductive polymer coating in accordance with claim 1 wherein the polymer binder is selected from the group consisting of inert polymers, charge transport polymers, and mixtures thereof, in an amount of from about 30 to about 80 weight percent of the total weight of the coating.

9. A conductive polymer coating in accordance with claim 1 wherein the polymer binder is a polymeric charge transport compound selected from the group consisting of polyvinylcarbazoles, polythiophenes, polysilanes, polyanilines, poly(phenylene vinylenes), polyphenylenes, poly(phenylene sulfides), polyanilines, poly(phenylene sulfide phenylenamine), copolymers thereof containing triarylamine charge transport groups, and mixtures thereof.

10. A conductive polymer coating in accordance with claim 1 further comprising an alkaline anti-corrosion additive selected from the group consisting of heterocyclic compounds with at least one nitrogen heteroatom, metallocene compounds, and mixtures thereof.

11. A conductive polymer coating in accordance with claim 1 wherein the arylamine charge transport compound is selected from the group consisting of those represented by the formulas:

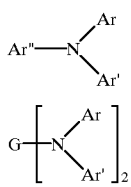

-continued

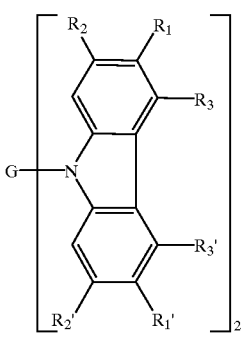

and

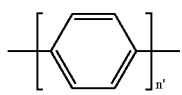

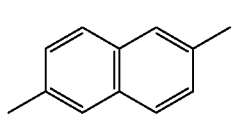

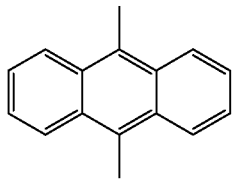

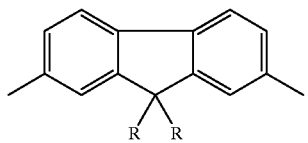

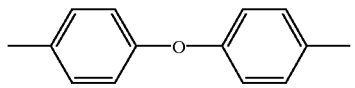

-continued

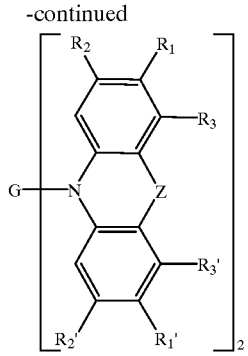

wherein Ar, Ar', and Ar" are independently selected from unsubstituted and substituted aromatic groups with from 6 to 30 carbon atoms, and $R_1$, $R_2$, $R_3$, $R_1'$, $R_2'$, and $R_3'$ are independently selected from the group consisting of hydrogen, bromine, chlorine, fluorine, alkyl groups with from 1 to about 24 carbon atoms, and alkoxy groups with from 1 to about 24 carbon atoms, Z is selected from the an atom O, S, Se, or substituent —$CH_2$—, G is an alkaline group with 1 to about 12 carbon atoms or a group selected from the partial formulas:

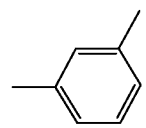

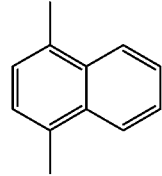

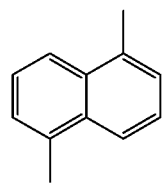

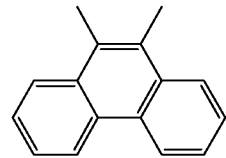

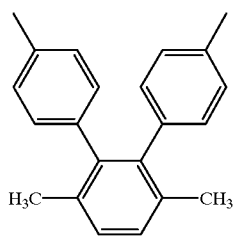

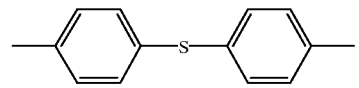

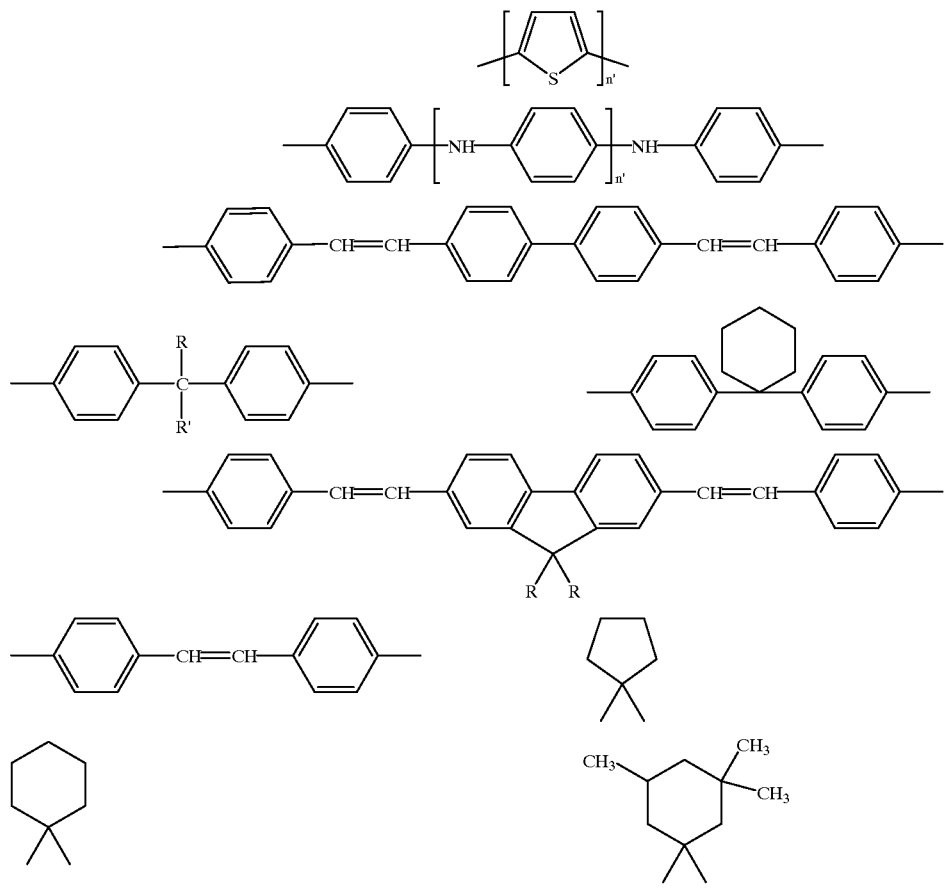
wherein n' is an integer from 1 to about 12, and R and R' are alkyl groups with 1 to about 12 carbon atoms.
12. A conductive polymer coating in accordance with claim 1 wherein the arylamine charge transport compound is selected from the formulas, and mixtures thereof:
a) aryldiamine compounds of the formula:
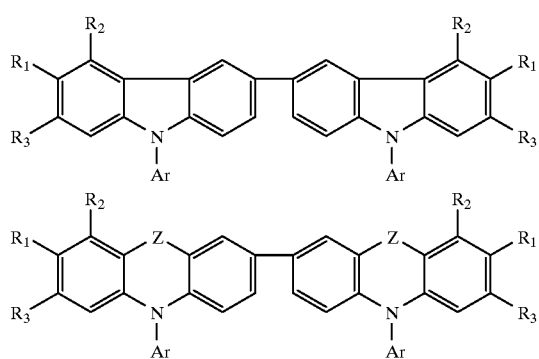
-continued
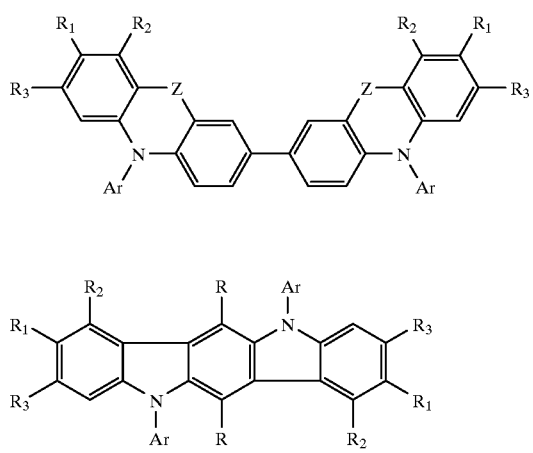
and

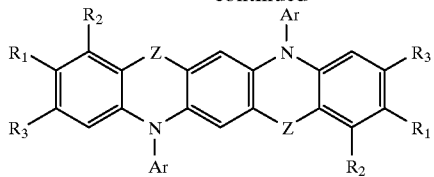

wherein Ar is a substituted or unsubstituted aromatic group, $R_1$, $R_2$ and $R_3$ are independently selected from the group consisting of hydrogen, bromine, chlorine, fluorine, alkyl groups with from 1 to about 24 carbon atoms, and alkoxy groups with from 1 to about 24 carbon atoms, and Z is selected from an atom O, S, Se, or methylene substituent —$CH_2$—;

b) aryltriamines compounds of the formula:

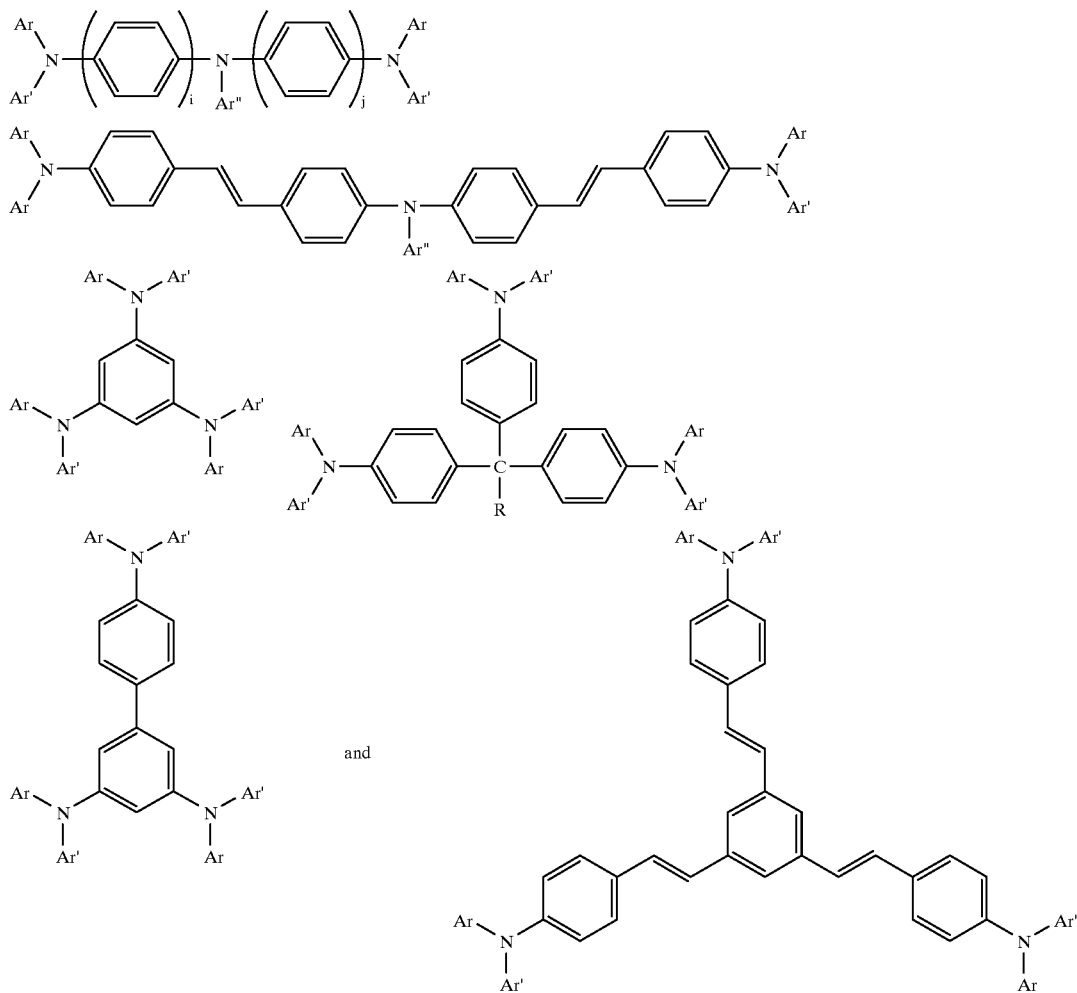

wherein Ar and Ar' are independently selected from substituted and unsubsttuted aromatic groups, R is selected from hydrogen, phenyl and alkyl groups containing 1 to about 12 carbon atoms, and wherein i and j are integers of 1 to about 2;

c) aryltetraamines compounds of the formula:

41

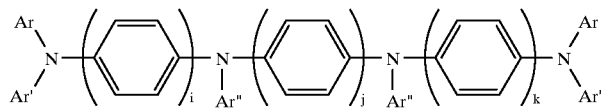

42

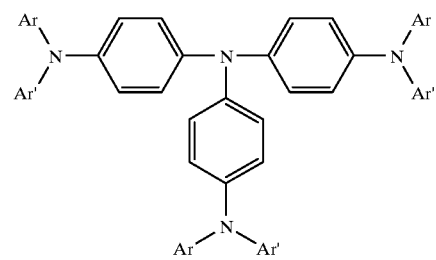

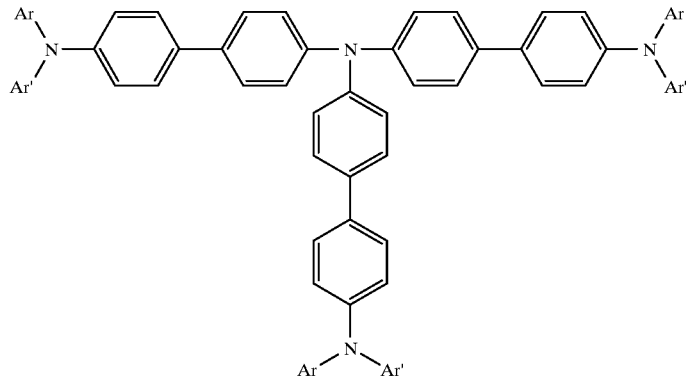

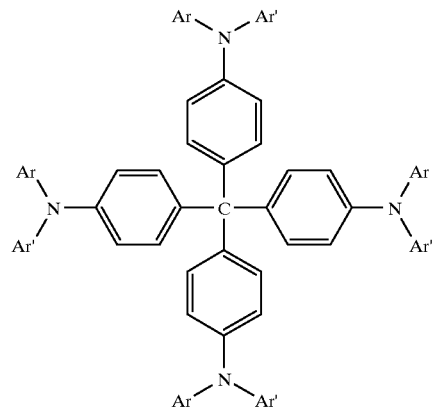

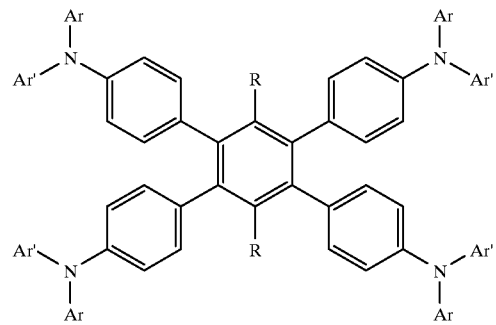

and

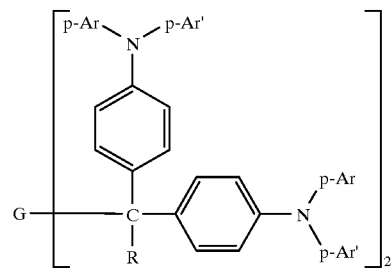

wherein Ar, Ar', and Ar" are independently selected from substituted and unsubstituted aromatic groups, p-Ar and p-Ar' are independently selected from para-substituted aromatic groups, R is selected from hydrogen, phenyl and alkyl groups containing 1 to about 12 carbon atoms, i, j, and k are integers 1 or 2, G is an alkaline group with 1 to about 12 carbon atoms or a group selected from the partial formulas:

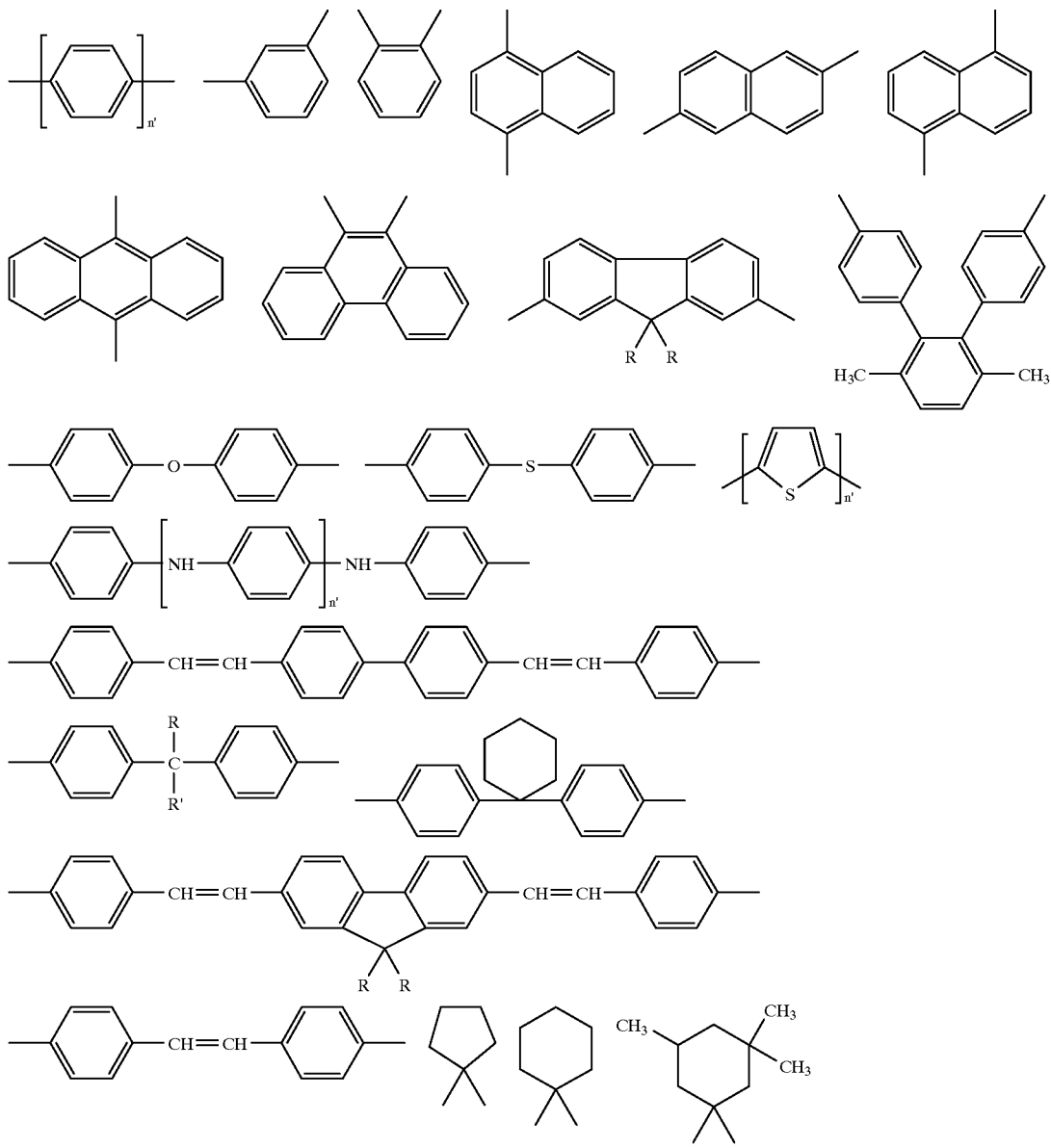
wherein n' is an integer from 1 to about 12, and R and R' are alkyl groups with 1 to about 12 carbon atoms;
d) arylpentaamines compounds of the formula:
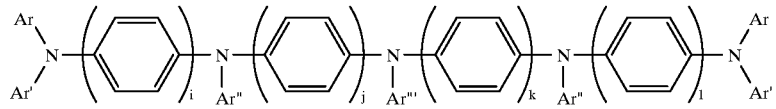
wherein Ar, Ar', Ar", and Ar'" are independently selected from substituted and unsubstituted aromatic groups, and i, j, k, and l are integers of 1 or 2; and e) arylhexaamines compounds of the formulas:
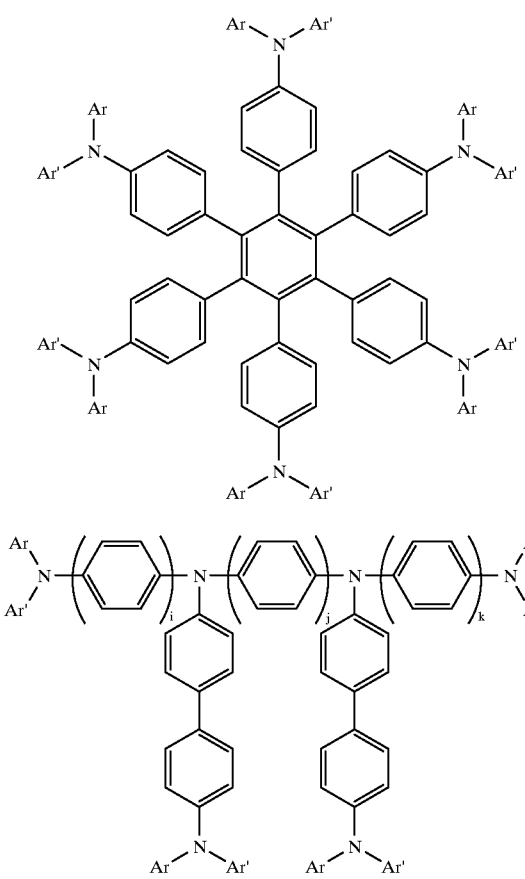
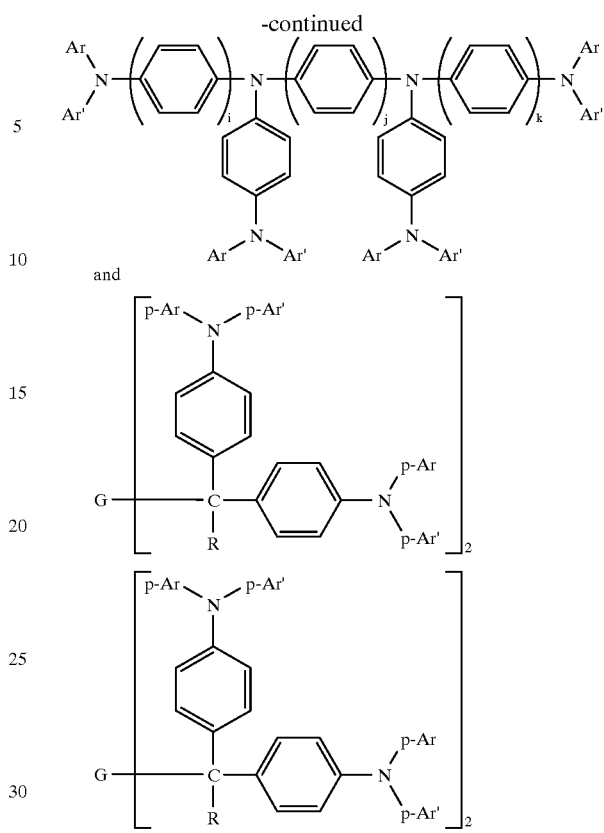
wherein Ar and Ar' are independently selected from substituted and unsubstituted aromatic groups, p-Ar and pAr' are para-substituted aromatic groups, i, j, and k are integers of 1 or 2, G is a alkaline-group with 1 to about 12 carbon atoms or an aromatic group of the formulas:
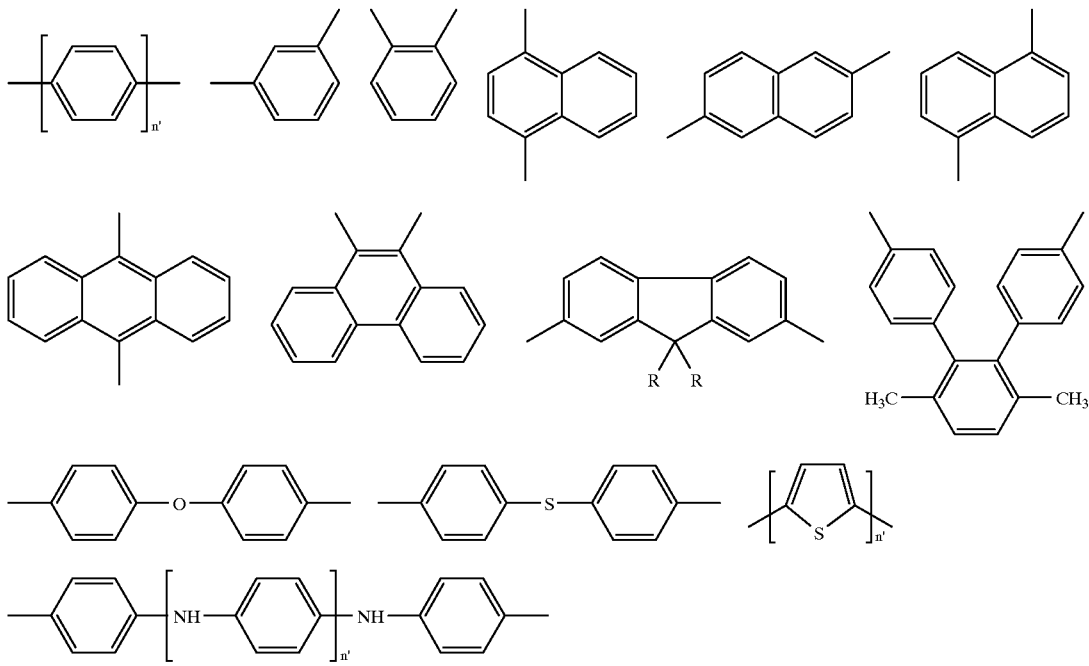

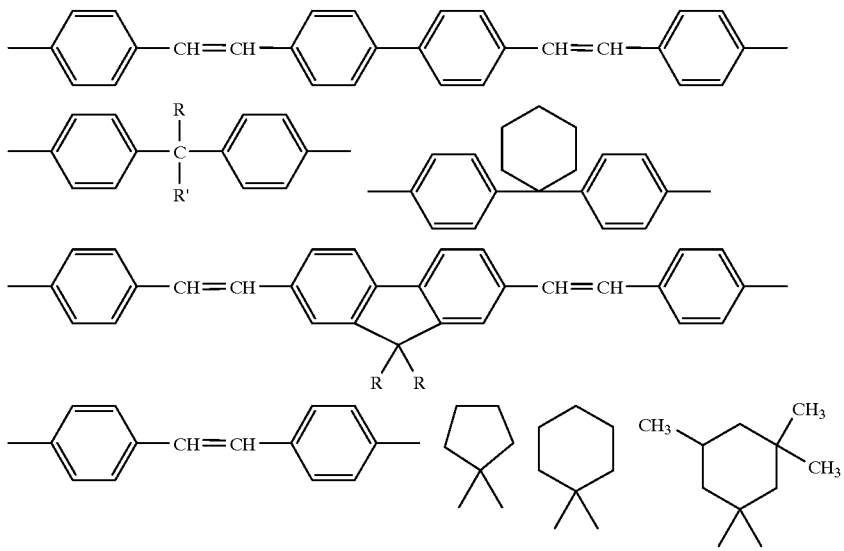

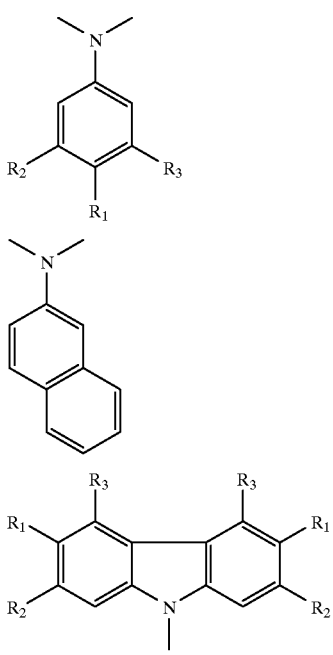

wherein n' is an integer from 1 to about 12, and R and R' are alkyl groups with 1 to about 12 carbon atoms.

13. A conductive polymer coating in accordance with claim 1 wherein the arylamine charge transport compound is selected from para-substituted triarylamine compounds with at least one of the para-substituted molecular segments of the formula:

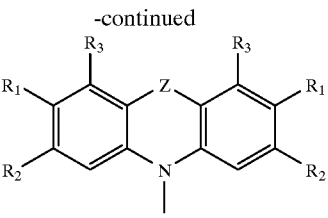

wherein $R_1$ is selected from the group consisting of bromine, chlorine, fluorine, alkyl groups with from 1 to about 24 carbon atoms, and alkoxy groups with from 1 to about 24 carbon atoms, $R_2$ and $R_3$ are independently selected from the group consisting of hydrogen, bromine, chlorine, fluorine, alkyl groups with from 1 to about 24 carbon atoms, and alkoxy groups with from 1 to about 24 carbon atoms, and Z is an atom O, S, Se, or a methylene substituent —$CH_2$.

14. A printing machine comprising an imaging member comprising a conductive coating in accordance with claim 1.

15. A conductive polymer coating comprising a para-substituted arylamine charge transport compound, and an oxidization product of the para-substituted arylamine charge transport compound and an oxidizing agent or salt.

16. A conductive polymer coating in accordance with claim 15, furthering comprising an additive selected from the group consisting of an alkaline anti-corrosion compound, a voltage stabilizing compound, and a polymer binder.

17. An electroluminescent device comprised of a conductive polymer coating of claim 15, wherein said coating is a thin film electrode or a contact modification layer, and wherein the coating facilitates charge injection.

18. A process for the preparation of a conductive polymer coating comprising:

mixing an arylamine charge transport molecule, and oxidant, optional additives and a polymer binder in a solvent to produce a coating mixture;

depositing the conductive polymer coating solution mixture on a substrate; and drying the coated substrate.

19. A process in accordance with claim 18, wherein the coating has a thickness of about 0.01 cm to about 0.5 cm and a conductivity of from about $10^{-12}$ to about 100.0 S/cm and which conductivity is stable over a relative humidity range of from about 0 to about 100 percent.

20. A process in accordance with claim 18, wherein the arylamine charge transport molecule is a para-substituted arylamine charge transport compound, and wherein the oxidant is selected from the group consisting of: chemical oxidants including ionic salts, Brønsted acids, halogens, Lewis acids, and mixtures thereof; photo-oxidants including diphenyliodonium salts and diarylsulfonium salts; and electrooxidation.

* * * * *